United States Patent
Plourde, Jr.

(10) Patent No.: US 7,194,563 B2
(45) Date of Patent: Mar. 20, 2007

(54) DISK DRIVER CLUSTER MANAGEMENT OF TIME SHIFT BUFFER WITH FILE ALLOCATION TABLE STRUCTURE

(75) Inventor: Harold J. Plourde, Jr., Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 767 days.

(21) Appl. No.: 10/005,628

(22) Filed: Dec. 5, 2001

(65) Prior Publication Data

US 2003/0105918 A1   Jun. 5, 2003

(51) Int. Cl.
*G06F 3/00* (2006.01)
*H04N 7/18* (2006.01)
*H04N 7/173* (2006.01)

(52) U.S. Cl. .......................... 710/52; 710/53; 710/56; 386/83; 386/112; 386/125; 725/111; 725/109; 725/35

(58) Field of Classification Search ................ 386/83, 386/112, 125; 710/52, 53, 56; 725/111
See application file for complete search history.

(56) References Cited

U.S. PATENT DOCUMENTS

| | | | | |
|---|---|---|---|---|
| 4,706,121 A | 11/1987 | Young | ........................ | 358/142 |
| 4,908,713 A | 3/1990 | Levine | ........................ | 358/335 |
| 4,963,994 A | 10/1990 | Levine | ........................ | 358/335 |
| 5,253,066 A | 10/1993 | Vogel | ........................ | 358/188 |
| 5,293,357 A | 3/1994 | Hallenbeck | ................ | 348/734 |
| 5,371,551 A | 12/1994 | Logan et al. | ................ | 348/571 |
| 5,477,262 A | 12/1995 | Banker et al. | .................. | 348/7 |
| 5,479,268 A | 12/1995 | Young et al. | ................ | 358/335 |
| 5,508,815 A | 4/1996 | Levine | ........................ | 358/335 |
| 5,568,272 A | 10/1996 | Levine | ........................ | 386/48 |
| 5,809,204 A | 9/1998 | Young et al. | .................. | 386/83 |
| 5,915,068 A | 6/1999 | Levine | ........................ | 386/83 |
| RE36,801 E | 8/2000 | Logan et al. | ................ | 348/571 |
| 6,151,688 A | 11/2000 | Wipfel et al. | .................. | 714/48 |
| 6,275,506 B1 | 8/2001 | Fazel et al. | .................. | 370/478 |
| 6,501,397 B1 | 12/2002 | Radha et al. | .................. | 341/60 |

(Continued)

FOREIGN PATENT DOCUMENTS

WO    WO 92/22983    12/1992

OTHER PUBLICATIONS

Scientific-Atlanta, Inc. Pending U.S. Appl. No. 10/008,624, filed Dec. 6, 2001, Title: "Converting Time-Shift Buffering for Personal Video Recording Into Permanent Recordings," Inventors: Harold J. Plourde, Jr. and Arturo A. Rodriguez.

(Continued)

*Primary Examiner*—Tammara Peyton

(57) ABSTRACT

A file allocation system for a hard disk drive includes a memory with driver logic and a processor configured with the driver logic to receive a request to allocate hard disk space of a defined size for a buffer file. In some embodiments, the processor is configured with the driver logic to allocate clusters for the buffer file from a plurality of clusters on the hard disk, wherein the clusters for the buffer file store media content instances. In some embodiments, the processor is configured with the driver logic to designate a portion of the clusters of the buffer file for at least one non-buffer file such that the non-buffer file is permitted to share the portion of the clusters of the buffer file with the buffer file.

45 Claims, 35 Drawing Sheets

U.S. PATENT DOCUMENTS

| | | | |
|---|---|---|---|
| 6,678,463 B1 * | 1/2004 | Pierre et al. | 386/83 |
| 6,782,550 B1 * | 8/2004 | Cao | 725/39 |
| 2001/0032293 A1 | 10/2001 | Korst et al. | 711/112 |
| 2002/0019984 A1 | 2/2002 | Rakib | 725/111 |

OTHER PUBLICATIONS

Scientific-Atlanta, Inc., Pending U.S. Appl. No. 10/008,439, filed Dec. 6, 2001, Title: "Dividing and Managing Time-Shift Buffering Into Program Specific Segments Based on Defined Duration," Inventors: Harold J. Plourde, Jr. and Arturo A. Rodriguez.

Scientific-Atlanta, Inc., Pending U.S. Appl. No. 10/010,781, filed Dec. 5, 2001, Title: "Application Managment and Interface for Cluster Control of Time Shift Buffer," Inventor: Harold J. Plourde, Jr.

Scientific-Atlanta, Inc. Pending U.S. Appl. No. 10/015,349, filed Dec. 11, 2001, Title: "Controlling Personal Video Recording Functions from Interactive Television," Inventors: Mark E. Schutte and Valerie G. Gutknecht.

Scientific-Atlanta, Inc. Pending U.S. Appl. No. 10/034,028, filed Dec. 20, 2001, Title: "Program Position User Interface for Personal Video Recording Time Shift Buffer," Inventors: Dariusz S. Kaminski and Robert O. Banker.

Scientific-Atlanta, Inc. Pending U.S. Appl. No. 10/102,043, filed Mar. 20, 2002, Title: "Composite Buffering," Inventors: John Eric West and Arturo A. Rodriguez.

Scientific-Atlanta, Inc. Pending U.S. Appl. No. 10/143,123, filed May 10, 2002, Title: "Channel Buffering and Display Managment System for Multi-Tuner Set-Top Box," Inventors: Arturo A. Rodriguez and Ramesh Nallur.

Scientific-Atlanta, Inc. Pending U.S. Appl. No. 10/143,647, filed May 10, 2002, Title: "Managing Time Shift Buffers," Inventors: Dariusz S. Kaminski, Arturo A. Rodriguez, Robert O. Banker and Valerie G. Gutknecht.

\* cited by examiner

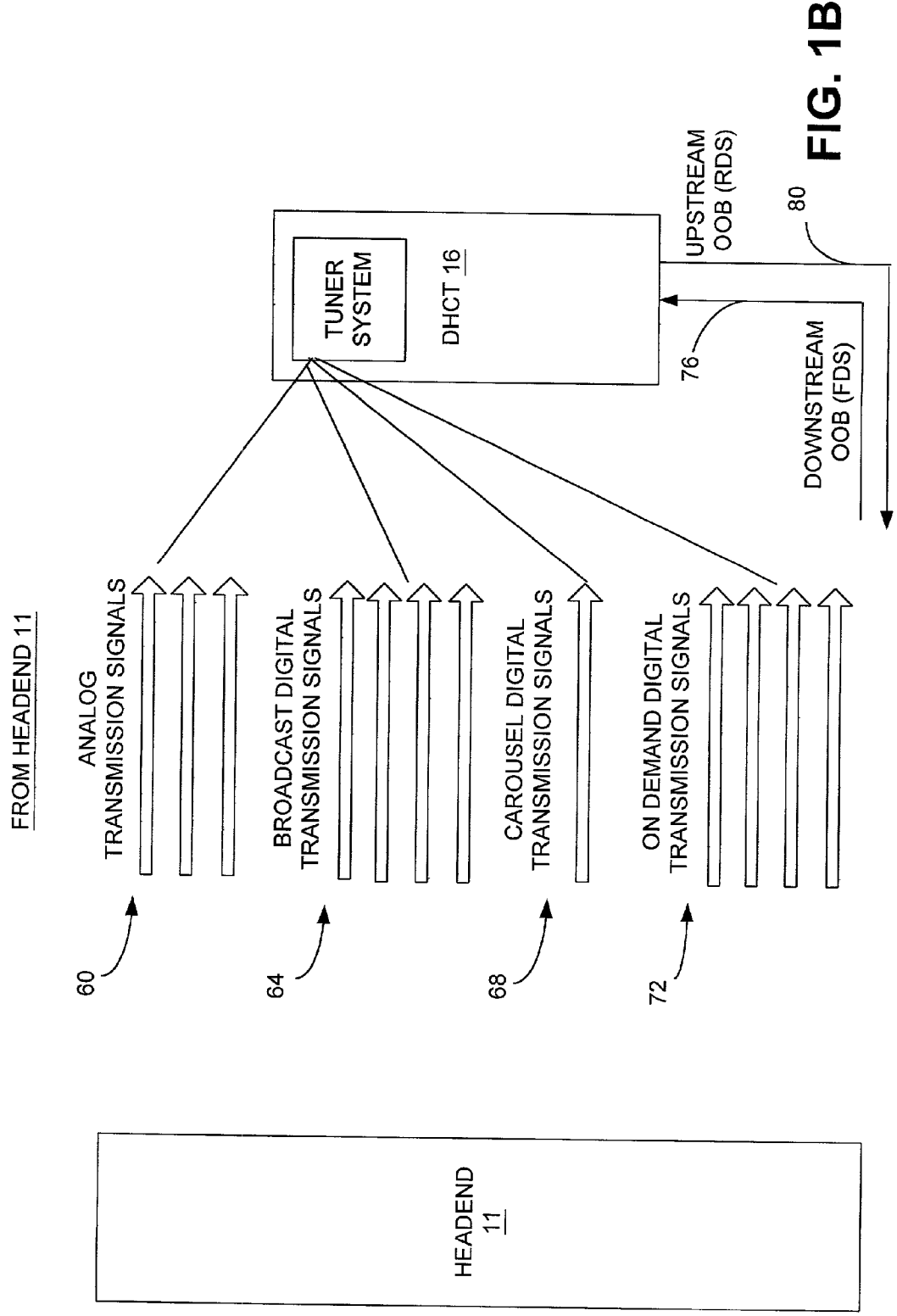

```
struct ProgramInfo
{
    char   *filename;
    bool    recorded;       /* 0 = do not permanently record */
    int     handle;         /* file handle, 0 = file closed        */
    char   *guideData;      /* program description, title, times   */
    time    startTime;      /* actual record start time            */
    time    stopTime;       /* actual record stop time       */
    int     startNPT;       /* start NPT for the media content instance*/
    int     stopNPT;        /* stop NPT for the media content instance*/
    int     tsbHandle;      /* handle for associated TSB     */
    int     tsbStartNPT;    /* start NPT for associated TSB  */
    int     tsbStopNPT;     /* stop NPT for associated TSB   */
    /* additional data */
};
```

FIG. 4A

```
struct TSBprogramInfo
{
460 ─── int    handle;      /* file handle, 0 = file closed   */
465 ─── List   programs;    /* list of ProgramInfo            */
470 ─── int    startNPT;    /* start NPT for the TSB          */
475 ─── int    recNPT;      /* current record NPT for the TSB */

/* additional data */

```
struct clusterInfo       /* cluster entry data in FAT */
{
    short numLinkedFiles;        /* number of linked files */
    /* additional data */
}
```

FIG. 6A

```
struct RecordedFileInfo
{
    ClusterList clusterList;     /* ordered list of clusters */
    unsigned   startingSector;
    unsigned   endingSector;
    /* additional data */
}
```

FIG. 6B

```
struct TSBfileInfo
{
    ClusterList clusterList;     /* ordered list of clusters
    /* additional data */
}
```

FIG. 6C void dvrm_TimeShift (ui32 *handle, TV_ID tvId)

FIG. 7A dvrm_Record (ui32 *handle, TV_ID tvId, char *filename, eDvr_Quality quality)

FIG. 7B dvrm_TimeShiftRecord (ui32 *handle, ui32 *tsbHandle, char *filename, i32 startNpt, i32 stopNpt)

FIG. 7C

| 3 | 7 | 8 | 9 | 10 | 12 | 16 | 17 | 30 | 31 | 34 |
|---|---|---|---|----|----|----|----|----|----|----|
| 1 | 2 | 2 | 2 | 1  | 1  | 1  | 1  | 1  | 1  | 1  |

| Pgm 2 | Pgm 3 | Pgm 4 |
|---|---|---|

| TSBar | L |
|---|---|

FIG. 9B

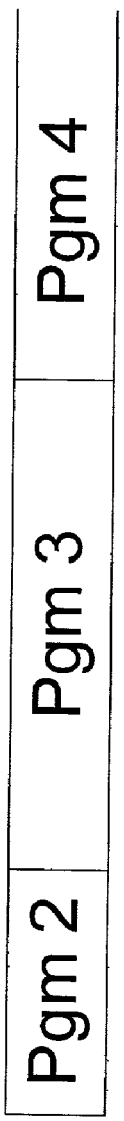
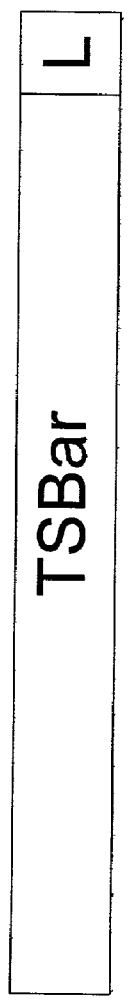
FIG. 9C dvrm_Status (ui32 handle, *i32 npt, sDvr_Scale *scale, ui32 *mode)

FIG. 10D void dvrm ConvertPlay (ui32 tsbHandle, ui32 handle)

FIG. 10E

| 3 | 7 | 8 | 9 | 10 | 12 | 16 | 17 | 30 | 31 | 34 | 35 | 36 | 37 | 38 |
|---|---|---|---|---|---|---|---|---|---|---|---|---|---|---|
| 1 | 1 | 1 | 2 | 1 | 2 | 2 | 2 | 1 | 1 | 1 | 1 | 1 | 1 | 1 |

| Pgm 2 | Pgm 3 | Pgm 4 | Pgm 5 |
|---|---|---|---|

| TSBar | L |
|---|---|

FIG. 11C

… # DISK DRIVER CLUSTER MANAGEMENT OF TIME SHIFT BUFFER WITH FILE ALLOCATION TABLE STRUCTURE

CROSS-REFERENCE TO RELATED APPLICATION

This application is related to copending U.S. patent application entitled "APPLICATION MANAGEMENT AND INTERFACE FOR CLUSTER CONTROL OF TIME SHIFT BUFFER," which is being filed on the same day as the present application and is hereby entirely incorporated herein by reference.

TECHNICAL FIELD

The present invention is generally related to television systems, and, more particularly, is related to a system and method for maintaining storage for media content.

BACKGROUND OF THE INVENTION

With recent advances in digital transmission technology, subscriber television systems are now capable of providing much more than the traditional analog broadcast video. In implementing enhanced programming, the home communication terminal device ("HCT"), otherwise known as the set-top box, has become an important computing device for accessing media content services (and media content within those services) and navigating a user through a maze of available services. In addition to supporting traditional analog broadcast video functionality, digital HCTs (or "DHCTs") now also support an increasing number of two-way digital services such as video-on-demand and personal video recording.

Typically, a DHCT is connected to a cable or satellite, or generally, a subscriber television system, and includes hardware and software necessary to provide the functionality of the digital television system at a user site. Typically, some of the software executed by a DHCT is downloaded and/or updated via the subscriber television system. Each DHCT also typically includes a processor, communication components, and memory, and is connected to a television or other display device, such as a personal computer. While many conventional DHCTs are stand-alone devices that are externally connected to a television, a DHCT and/or its functionality may be integrated into a television or personal computer or even an audio device such as a programmable radio, as will be appreciated by those of ordinary skill in the art.

DHCTs are typically capable of providing users with a very large number and variety of media content choices. As the number of available media content choices increases, viewing conflicts arise whereby the user must choose between watching two or more media content instances (e.g. discrete, individual instances of media content such as, for a non-limiting example, a particular television show or "program"), all of which the user would like to view. Further, because of the large number of viewing choices, the user may miss viewing opportunities. Storage devices coupled to the DHCT help alleviate this problem by providing a mechanism to store media content for later retrieval for viewing. However, media content storage systems are often inefficient. Therefore, there exists a need to efficiently store media content Thus, a heretofore unaddressed need exists in the industry to address the aforementioned deficiencies and inadequacies.

BRIEF DESCRIPTION OF THE DRAWINGS

The preferred embodiment of the present invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1B shows a block diagram of the transmission signals supported by the STS of FIG. 1A, and input into the digital home communication terminal (DHCT) from the headend, in accordance with one embodiment of the invention.

FIG. 4A is a programming diagram of example software programming code in conventional "C" computer language that can be used to create and maintain the data structure for each media content instance received into a time shift buffer (TSB), in accordance with one embodiment of the invention.

FIG. 4B is a programming diagram of example software programming code in conventional "C" computer language that can be used to create and maintain an ordered list of media content instances for the TSB, in accordance with one embodiment of the invention.

FIGS. 6A–6C are programming diagrams of example software programming code in conventional "C" computer language for maintaining an inventory of allocated clusters and data for the clusters for the FAT depicted in FIG. 5A, in accordance with one embodiment of the invention.

FIGS. 7A–7C are programming diagrams of example software programming code in conventional "C" computer language corresponding to driver application programming interfaces (APIs) invoked by the personal video recording (PVR) application, in accordance with one embodiment of the invention.

FIGS. 9A–9E are block diagram illustrations depicting how the device driver manages cluster allocations and deallocations for permanent recordings out of the TSB, in accordance with one embodiment of the invention.

FIGS. 10D and 10E are programming diagrams of example software programming code in conventional "C" computer language corresponding to driver APIs that handle playback transitions between the permanently recorded file and the TSB file, in accordance with one embodiment of the invention.

FIGS. 11A–11C are block diagram illustrations depicting how the device driver manages permanently recording multiple contiguous media content instances from the TSB, in accordance with one embodiment of the invention.

DETAILED DESCRIPTION OF THE PREFERRED EMBODIMENTS

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting and among others.

Figure 1A:
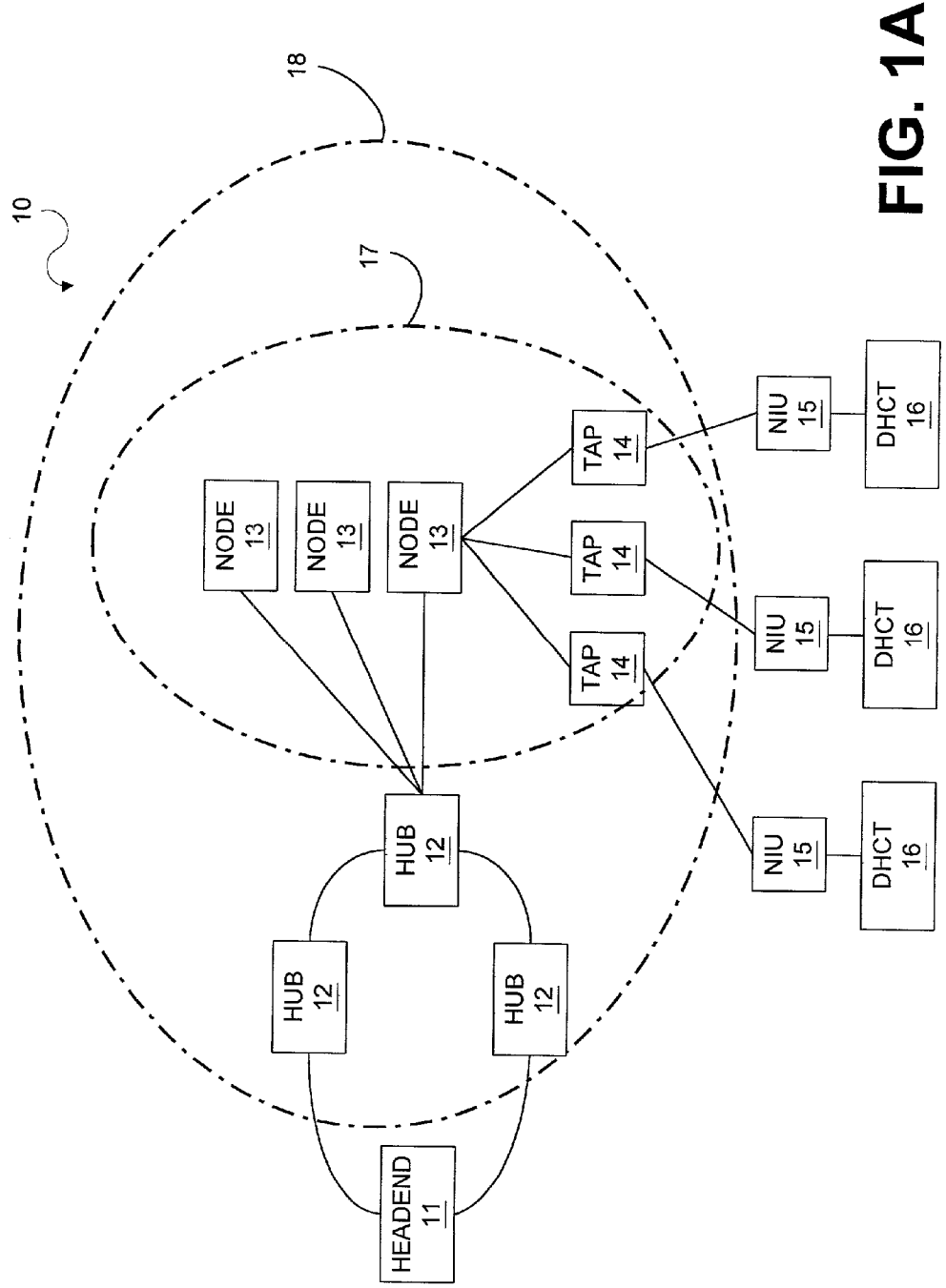
FIG. 1A is a block diagram of an example subscriber television system (STS), in accordance with one embodiment of the invention.

One embodiment of the present invention is generally implemented as part of a subscriber television system (STS), which includes digital broadband delivery systems (DBDS) and cable television systems (CTS). As a non-limiting example, a subscriber television system (STS) and its operation will be described initially, with the understanding that other conventional data delivery systems are within the scope of the preferred embodiments of the invention. FIG. 1A shows a block diagram view of a STS 10, which is generally a high quality, reliable and integrated network system that is typically capable of delivering video, audio, voice and data services to digital home communication terminals (DHCTs) 16. Although FIG. 1A depicts a high level view of a STS 10, it should be appreciated that a plurality of subscriber television systems can tie together a plurality of regional networks into an integrated global network so that DHCT users can receive media content provided from anywhere in the world.

Further, it will be appreciated that the STS 10 shown in FIG. 1A is merely illustrative and should not be construed as implying any limitations upon the scope of the preferred embodiments of the present invention. For instance, subscriber television systems also included within the scope of the preferred embodiments of the invention include systems not utilizing physical structured cabling for transmission, such as, but not limited to, satellite systems. Further, transmission media included within the scope of the preferred embodiments of the invention include, but are not limited to, HFC, optical, satellite, RF, FM, and microwave. Further, data provided from the headend 11 to the DHCTs 16 and programming necessary to perform the functions discussed below will be understood to be present in the STS 10, in accordance with the description below.

The STS 10 typically delivers broadcast video signals as digitally formatted signals in addition to delivering traditional broadcast analog video signals. Furthermore, the system can typically support one way broadcast services as well as both one-way data services and two-way media content and data services. The two-way operation of the network typically allows for user interactivity with services, such as Pay-Per-View programming, Near Video-On-Demand (NVOD) programming according to any of several known NVOD implementation methods, Video-on-Demand (VOD) programming (according to any of several VOD implementation methods), and interactive applications, such as Internet connections.

The STS 10 also provides the interfaces, network control, transport control, session control, and servers to access media content from media content services, and distributes media content to DHCT users. As shown in FIG. 1A, a typical STS 10 comprises a headend 11, hubs 12, an HFC access network 17, and DHCTs 16. It should be appreciated that although a single component (e.g. a headend) is illustrated in FIG. 1A, a STS 10 can feature a plurality of any one of the illustrated components or may be configured with alternative embodiments for any one of the individual components or with yet other additional components not enumerated above.

Media content provided by one or more content providers (not shown) is communicated by the content providers to one or more headends 11. From those headends 11 the media content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which, in one embodiment, is connected to a network interface unit (NIU) 15 which is connected to a digital home communication terminal (DHCT) 16. In other embodiments, the tap 14 is connected directly to a digital home communication terminal (DHCT) 16. The NIU 15, when implemented, is normally located at the property of a subscriber and provides a transparent interface between the HFC node 13 and the user property internal wiring. Coaxial cables are typically used to couple nodes 13, taps 14 and NIUs 15 because the electrical signals can be easily repeated with radio frequency (RF) amplifiers.

As the high-level operations of many of the functions of a STS 10 are well known to those of ordinary skill in the art, further high level description of the overall STS 10 of FIG. 1A will not be contained herein FIG. 1B is a block diagram illustrating the transmission signals supported by the STS 10 (FIG. 1A), where the transmission signals 60, 64, 68, 72 and 76 are input into a DHCT 16 in accordance with one embodiment of the invention. Preferably, one or more content providers (not shown) provide the content that is included in the transmission signals. Transmission signals can be generated at a headend 11 or at a hub 12 (FIG. 1A) that might function as a mini-headend and which therefore possesses some of the headend functionality. In some implementations, the transmission signals can be provided by one or more of the content providers.

As depicted in FIG. 1B, the STS 10 (FIG. 1A) can simultaneously support a number of transmission signal types, transmission rates, and modulation formats. The ability to carry analog and digital signals over a large bandwidth are characteristics of a Hybrid Fiber/Coax (HFC) Network typically employed in a STS, as in the STS 10 of FIG. 1A. As will be appreciated by those of ordinary skill in the art, analog and digital signals in HFC networks can be multiplexed using Frequency Division Multiplexing (FDM), which enables many different types of signals to be transmitted over the STS 10 to the DHCT 16. Typically, a STS 10 using HFC supports downstream (i.e., in the direction from the headend 11 to the DHCT 16) frequencies from 50 MHz to 870 MHz, whereas upstream frequencies (i.e., in the direction from the DHCT 16 to higher levels of the system) are in the 5 MHz to 42 MHz band. Generally, the radio frequency (RF) bandwidth spacing for analog and digital services is 6 MHz. Furthermore, for a typical 870 MHz system in the U.S., a possible downstream RF spectrum subdivision plan uses 6 MHz frequency subdivisions, or spans, within the 50 MHz to 550 MHz band for analog video transmission signals and within the 550 MHz to 870 MHz range for digital transmission signals. The Analog Transmission Signals (ATSs) 60 shown in FIG. 1B are typically broadcast in 6 MHz frequency subdivisions, typically referred to in analog broadcasting as channels, having an analog broadcast signal composed of analog video and analog audio, and include Broadcast TV Systems Committee (BTSC) stereo and Secondary Audio Program (SAP) audio. Referring again to FIG. 1B, the downstream direction transmission signals, having been multiplexed, and in one embodiment using frequency division multiplexing (FDM), are often referred to as in-band transmission signals and include Analog Transmission Signals (ATSs) 60 and Digital Transmission Signals (DTSs) 64, 68, 72 (also known as Digital Transport Signals). These transmission signals carry video, audio and data services. For example, these transmission signals may carry television signals, Internet data, or any additional types of data, such as Electronic Program Guide (EPG) data. Additionally, as will be appreciated by those of ordinary skill in the art, additional data can be sent with the analog video image in the Vertical Blanking Interval (VBI) of the video signal and stored in DHCT memory or a DHCT local physical storage device (not shown). It should be appreciated, however, that the amount of data that can be transmitted in the VBI of the analog video signal is typically significantly less than data transmitted in a DTS.

Like the ATSs 60, the DTSs 64, 68, 72 each occupies 6 MHz of the RF spectrum. However, the DTSs 64, 68, 72 are digital transmission signals consisting of 64- or 256-Quadrature Amplitude Modulated (QAM) digital signals formatted as MPEG-2 transport streams, allocated in a separate frequency range. As will be described in more detail below, the MPEG-2 transport stream enables transmission of a plurality of DTS types over each 6 MHz RF subdivision, as compared to a 6 MHz ATS. The three types of digital transport signals illustrated in FIG. 1B include broadcast digital transmission signals 64, carousel digital transmission signals 68, and on-demand transmission signals 72.

MPEG-2 transport may be used to multiplex video, audio, and data in each of these Digital Transmission Signals (DTSs). However, because an MPEG-2 transport stream allows for multiplexed video, audio, and data into the same stream, the DTSs do not necessarily have to be allocated in separate 6 MHz RF frequencies, unlike ATSs 60. On the other hand, each DTS is capable of carrying multiple broadcast digital video media content instances, multiple cycling data carousels containing broadcast data, and data requested on-demand by the subscriber. Data is formatted, such as in Internet Protocol (IP), mapped into MPEG-2 packets, and inserted into the multiplexed MPEG-2 transport stream. Encryption can be applied to the data stream for security so that the data may be received only by authorized DHCTs. The authorized DHCT 16 is provided with the mechanisms to receive, among other things, additional data or enhanced services. Such mechanisms can include "keys" that are required to decrypt encrypted data.

Each 6 MHz RF subdivision assigned to a digital transmission signal can carry the video and audio streams of the media content instances of multiple television (TV) stations, as well as media content and data that is not necessarily related to those TV media content instances, as compared to one TV channel broadcast over one ATS 60 that consumes the entire 6 MHz. The digital data is inserted into MPEG transport streams carried through each 6 MHz frequency subdivision assigned for digital transmission, and then de-multiplexed at the subscriber DHCT so that multiple sets of data can be produced within each tuned 6 MHz frequency span, or subdivision.

Although broadcast in nature, the carousel DTSs 68 and on-demand DTSs 72 offer different functionality. Continuing with FIG. 1B, the broadcast DTSs 64 and carousel DTSs 68 typically function as continuous feeds for indefinite time, whereas the on-demand DTSs 72 are continuous feeds sessions for a limited time. All DTS types are capable of being transmitted at high data rates. The broadcast DTSs 64 carry typical data comprising multiple digitally-MPEG-2 compressed and formatted TV source signals and other continuously fed data information. The carousel DTSs 68 carry broadcast media content or data that is systematically broadcast in a cycling fashion but updated and revised as needed. Thus, the carousel DTSs 68 serve to carry high volume data such as media content and data and possibly, other data at high data rates. The carousel DTSs 68 preferably carry data formatted in directories and files by a Broadcast File System (BFS) (not shown), which is used for producing and transmitting data streams throughout the STS 10, and which provides an efficient means for the delivery of application executables and application media content and data to the DHCT, as will be described below. Media content and data received by the DHCT 16 in such manner can then be saved in the DHCT memory and/or transferred to the DHCT storage device for later use. The on-demand DTSs 72, on the other hand, can carry particular information such as compressed video and audio pertaining to subscriber requested media content instance preview and/or media content instance descriptions, as well as other specialized data information.

The User-to-Network Download Protocol of the MPEG-2 standard's DSM-CC specification (Digital Storage Media—Command and Control) provides the data carousel protocol used for broadcasting data from a server located at headend 11, or elsewhere. It also provides the interactive download protocol for reliable downloading of data from a server (possibly the same server) to an individual DHCT through the on-demand DTSs. Each carousel and on-demand DTS is defined by a DSM-CC session. Therefore, some of the basic functionality reflected in the DHCT 16 when the DHCT does not have a local physical storage device is somewhat similar to a networked computer (i.e., a computer without a persistent storage device), in addition to traditional set top box functionality, as is well known to those of ordinary skill in the art. A DHCT 16 with a storage device reduces data access latency when the data is stored in the local physical storage device ahead of time.

Also shown in FIG. 1B are Out-Of-Band (OOB) signals that provide continuously available two-way signaling to the subscribers' DHCT 16 regardless of which in-band signals are tuned to by the individual DHCT in-band tuners, as described below. The OOB signals consist of a Forward Data Signal (FDS) 76 and a Reverse Data Signal (RDS) 80. The OOB signals can comply to any one of a number of well known transport protocols but preferably comply to either a DAVIC 1.1 Transport Protocol with FDS of 1.544 mega-bits per second (Mbps) or more using quadrature phase shift keying (QPSK) modulation and an RDS of 1.544 Mbps or more using QPSK modulation, or to a DOCSIS Transport Protocol with FDS of 27 Mbps using 64-QAM modulation and a RDS of 1.544 Mbps or more using QPSK modulation or 16-QAM modulation. The OOB signals provide the two-way operation of the network, which allows for subscriber interactivity with the applications and services provided by the network. Furthermore, the OOB signals are not limited to a 6 MHz spectrum, but generally to a smaller spectrum, such as 1.5 or 3 MHz.

Figure 2:
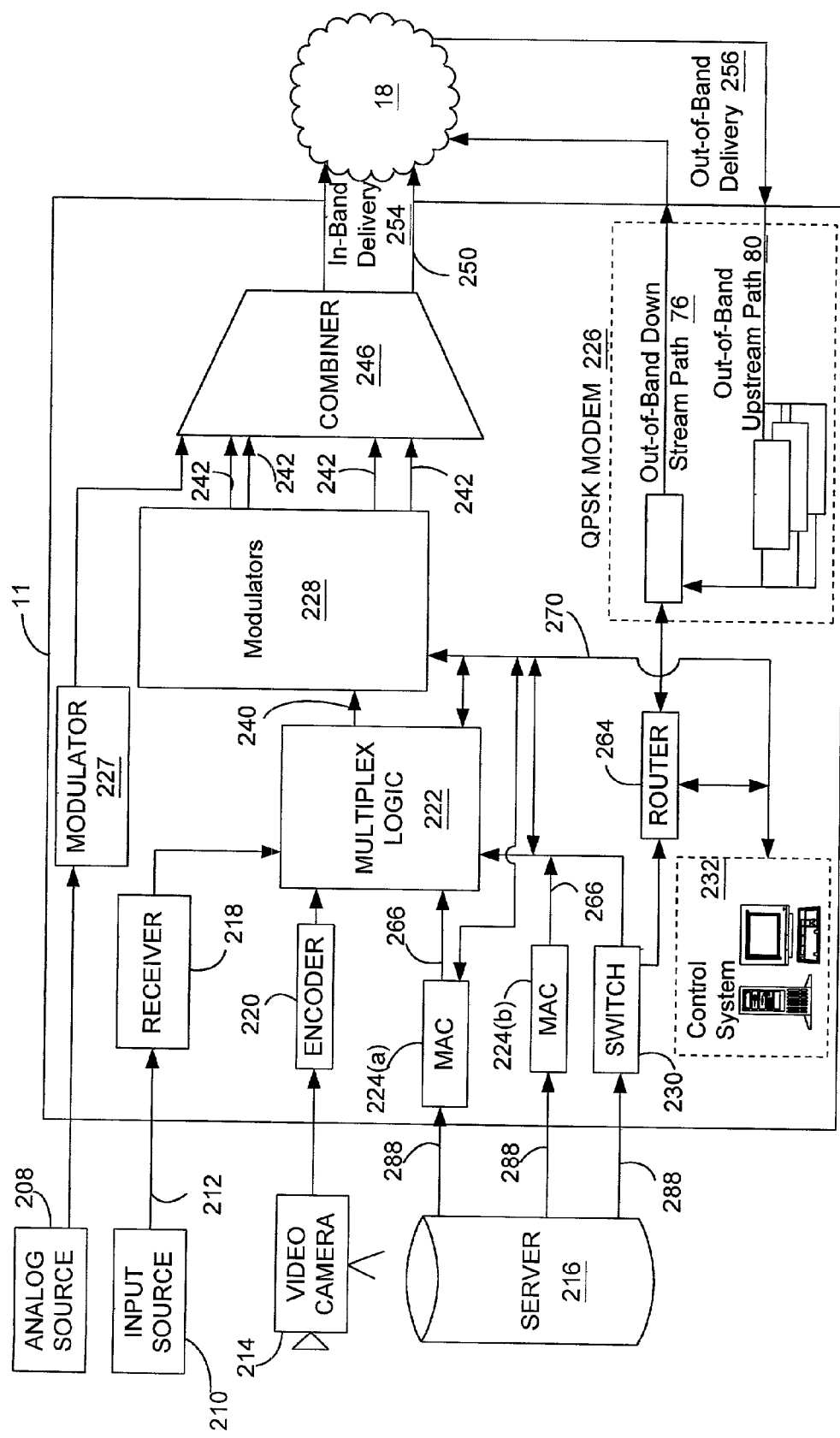
FIG. 2 is a block diagram of an example headend as depicted in FIG. 1A and related equipment, in accordance with one embodiment of the invention.

FIG. 2 is an overview of a headend 11, which provides the interface between the STS 10 (FIG. 1A) and the service and content providers. The overview of FIG. 2 is equally applicable to a hub 12, and the same elements and principles may be implemented at a hub 12 instead of the headend 11 as described herein. It will be understood that the headend 11 shown in FIG. 2 is merely illustrative and should not be construed as implying any limitations upon the scope of the preferred embodiments of the invention. The headend 11 receives content from a variety of service and content providers, which can provide input in a variety of ways. The headend 11 combines the content from the various sources and distributes the content to subscribers via the distribution systems of the network 18.

In a typical system, the programming, services and other information from content providers can be distributed according to a variety of mechanisms. The input signals may be transmitted from sources to the headend 11 via a variety of transmission paths, including satellites (not shown), and terrestrial broadcast transmitters and antennas (not shown). The headend 11 can also receive content from a direct feed source 210 via a direct line 212. Other input sources from content providers include a video camera 214, analog input source 208, or an application server 216. The application server 216 may include more than one line of communication. One or more components such as analog input source 208, input source 210, video camera 214, and application server 216 can be located external to the headend 11, as shown, or internal to the headend 11 as would be appreciated by one having ordinary skill in the art. The signals provided by the content or programming input sources can include a single media content instance (i.e. individual instances of media content such as an episode of a television show, a movie, or a web-page, etc.) or a multiplex that includes several media content instances.

The headend 11 generally includes one or more receivers 218 that are each associated with a content source. MPEG encoders, such as encoder 220, are included for digitally encoding at least some local programming or a real-time feed from video camera 214, or the like. The encoder 220 outputs the respective compressed video and audio streams corresponding to the analog audio/video signal received at its input. For example, encoder 220 can output formatted MPEG-2 or MPEG-1 packetized elementary (PES) streams or transport streams compliant to the syntax and semantics of the ISO MPEG-2 standard, respectively. The PES or transport streams may be multiplexed with input signals from switch 230, receiver 218 and control system 232. The multiplexing logic 222 processes the input signals and multiplexes at least a portion of the input signals into transport stream 240. Analog input source 208 can provide an analog audio/video broadcast signal which can be input into modulator 227. From modulator 227, a modulated analog output signal can be combined at combiner 246 along with other modulated signals for transmission into transmission medium 250. Alternatively, analog audio/video broadcast signal from analog input source 208 can be input into modulator 228. Alternatively, analog audio/video broadcast signal can be input directly from modulator 227 to transmission medium 250. The analog broadcast media content instances are transmitted via respective radio-frequency (RF) channels, each assigned for transmission of an analog audio/video signal such as NTSC video, as described in association with FIG. 1B.

The switch, such as asynchronous transfer mode (ATM) switch 230, provides an interface to an application server 216. There can be multiple application servers 216 providing a variety of services such as a Pay-Per-View service, including video on demand (VOD), a data service, an Internet service, a network system, or a telephone system. Service and content providers may download content to an application server located within the STS 10. The application server 216 may also be located within the headend 11 or elsewhere within the STS 10, such as in a hub 12. The various inputs into the headend 11 are then combined with the other information from the control system 232, which is specific to the STS 10, such as local programming and control information, which can include among other things conditional access information. The headend 11 contains one or more modulators 228 to convert the received transport streams 240 into modulated output signals suitable for transmission over the transmission medium 250 through the network 18. Each modulator 228 may be a multimodulator including a plurality of modulators, such as, but not limited to, QAM modulators, that radio frequency modulate at least a portion of the transport streams 240 to become output transport streams 242. The output signals 242 from the various modulators 228 or multimodulators are combined, using equipment such as a combiner 246, for input into the transmission medium 250, which is sent via the in-band delivery path 254 to subscriber locations (not shown). In-band delivery path 254 can include DTS 64, 68, 72, and ATS 60, as described with FIG. 1B. In one embodiment, the server 216 also provides various types of data 288 to the headend 11. The data, in part, is received by the media access control functions 224, that output MPEG transport packets containing data 266 instead of digital audio/video MPEG streams. The control system 232 enables the television system operator to control and monitor the functions and performance of the STS 10. The control system 232 interfaces with various components, via communication link 270, in order to monitor and/or control a variety of functions, including the frequency spectrum lineup of the programming for the STS 10, billing for each subscriber, and conditional access for the content distributed to subscribers. Information, such as conditional access information, is communicated from the control system 232 to the multiplexing logic 222 where it is multiplexed into a transport stream 240.

Among other things, the control system 232 provides input to the modulator 228 for setting the operating parameters, such as selecting certain media content instances or portions of transport streams for inclusion in one or more output transport stream 242, system specific MPEG table packet organization, and/or conditional access information. Control information and other data can be communicated to hubs 12 and DHCTs 16 via an in-band delivery path 254 or via an out-of-band delivery path 256.

The out-of-band data is transmitted via the out-of-band FDS 76 (FIG. 1B) of transmission medium 250 by means such as, but not limited to, a Quadrature Phase-Shift Keying (QPSK) modem array 226. Two-way communication utilizes the RDS 80 (FIG. 1B) of the out-of-band delivery path 256. Hubs 12 and DHCTs 16 transmit out-of-band data through the transmission medium 250, and the out-of-band data is received in headend 11 via out-of-band RDS 80. The out-of-band data is routed through router 264 to an application server 216 or to control system 232. The out-of-band control information includes such information as a pay-per-view purchase instruction and a pause viewing command from the subscriber location to a video-on-demand type application server located internally or external to the headend 11, such as application server 216, as well as any other data sent from the DHCT 16 (FIG. 1A) or hubs 12, all of which will preferably be properly timed. The control system 232 also monitors, controls, and coordinates all communications in the subscriber television system, including video, audio, and data. The control system 232 can be located at the headend 11 or remotely.

The transmission medium 250 distributes signals from the headend 11 to the other elements in the subscriber television system, such as a hub 12, a node 13, and subscriber locations (FIG. 1A). The transmission medium 250 can incorporate one or more of a variety of media, such as optical fiber, coaxial cable, and hybrid fiber-coax (HFC), satellite, direct broadcast, or other transmission media.

Figure 3A:
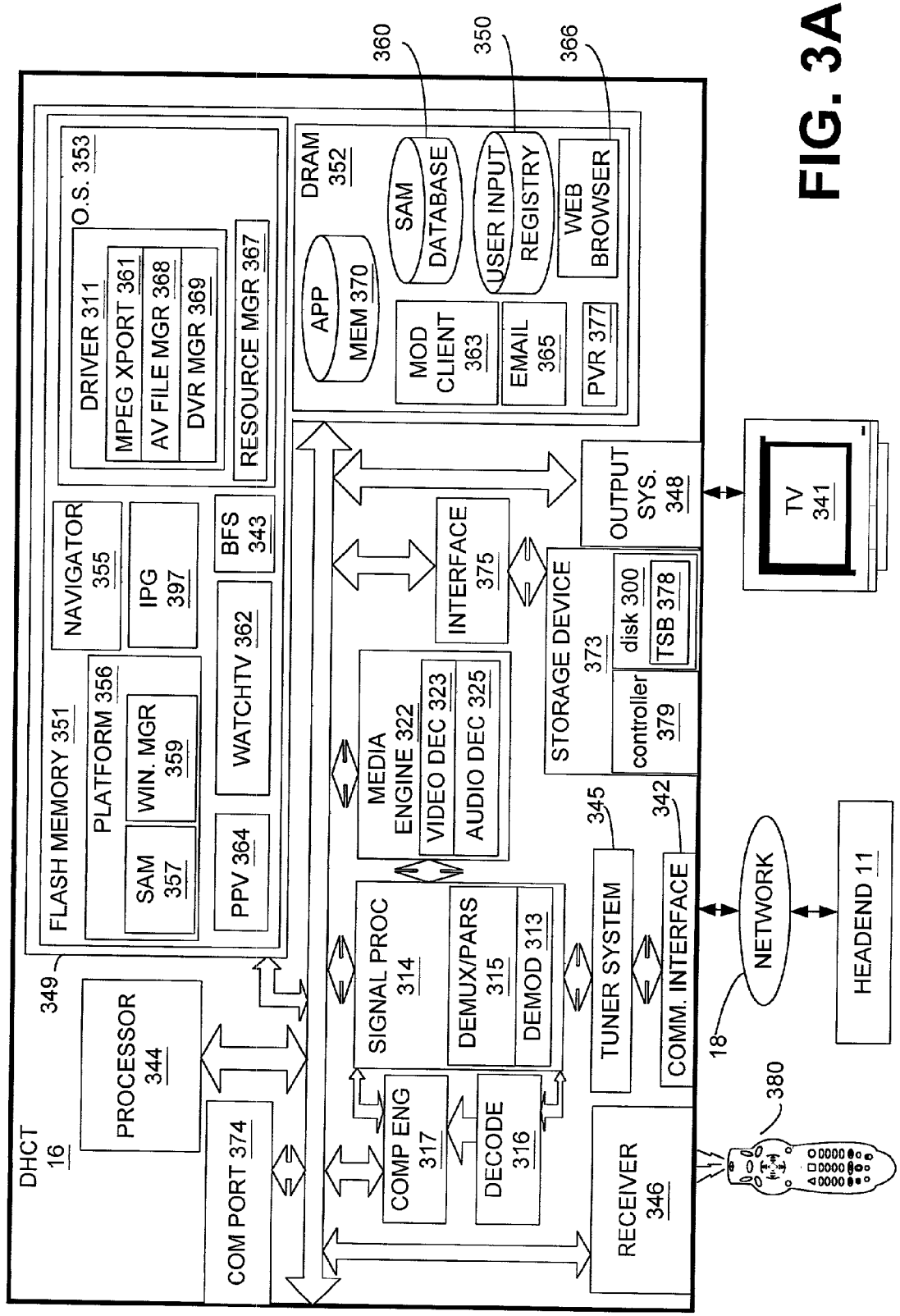
FIG. 3A is a block diagram of an example DHCT as depicted in FIG. 1A and related equipment, in accordance with one embodiment of the invention.

FIG. 3A is a block diagram illustration of an example DHCT 16 that is coupled to a headend 11 and to a television, in accordance with one embodiment of the invention. It will be understood that the DHCT 16 shown in FIG. 3A is merely illustrative and should not be construed as implying any limitations upon the scope of the preferred embodiments of the invention. For example, some of the functionality performed by applications executed in the DHCT 16 (such as the MOD client application 363) may instead be performed at the headend 11 and vice versa, or not at all in some embodiments. A DHCT 16 is typically situated at the residence or place of business of a user and may be a stand-alone unit or integrated into another device such as, for example, a television set or a personal computer or other display devices or an audio device. The DHCT 16 preferably includes a communications interface 342 for receiving signals (video, audio and/or other data) from the headend 11 through the network 18 and for providing any reverse information to the headend 11 through the network 18.

The DHCT 16 further preferably includes at least one processor 344 for controlling operations of the DHCT 16, an output system 348 for driving the television display 341, and at least one tuner system 345 for tuning into a particular television channel or frequency to be displayed and for sending and receiving various types of data or media content to and from the headend 11. The DHCT 16 may include, in other embodiments, multiple tuners for receiving downloaded (or transmitted) media content. Tuner system 345 can select from a plurality of transmission signals (FIG. 1B) provided by the subscriber television system. Tuner system 345 enables the DHCT 16 to tune to downstream media and data transmissions, thereby allowing a user to receive digital or analog media content delivered in the downstream transmission via the subscriber television system. The tuner system 345 includes, in one implementation, an out-of-band tuner for bi-directional quadrature phase shift keying (QPSK) data communication and a quadrature amplitude modulation (QAM) tuner (in band) for receiving television signals. Additionally, a receiver 346 receives externally generated information, such as user inputs or commands from an input device, such as remote control device 380, or other devices.

According to another embodiment of the invention, a telephone modem (not shown) in the DHCT 16 can be utilized for upstream data transmission and a headend 11, hub 12 (FIG. 1A) or other component located upstream in the STS 10 (FIG. 1A) can receive data from a telephone network corresponding with the telephone modem and can route the upstream data to a destination internal or external to the STS 10, such as an application data server in the headend 11 or content provider.

The DHCT 16 includes signal processing system 314, which comprises demodulating system 313 and transport demultiplexing and parsing system 315 (herein demultiplexing system) to process broadcast media content and/or data. One or more of the systems of signal processing system 314 can be implemented with software, a combination of software and hardware, or preferably in hardware. Demodulating system 313 comprises functionality for RF signal demodulation, either an analog transmission signal or a digital transmission signal. For instance, demodulating system 313 can demodulate a digital transmission signal in a carrier frequency that was modulated, among others, as a QAM-modulated signal. When tuned to a carrier frequency corresponding to an analog TV signal transmission, demultiplexing system 315 is bypassed and the demodulated analog TV signal that is output by demodulating system 313 is instead routed to analog video decoder 316. Analog video decoder 316 converts the analog video signal (i.e. the video portion of a media content instance that comprises a video portion and an audio portion) received at its input into a respective non-compressed digital representation comprising a sequence of digitized pictures and their respective digitized audio. Presented at the input to analog video decoder 316 is an analog video signal such as NTSC video comprising of audio and video. In one implementation, the video consists of a sequence of fields spaced apart at approximately one-sixtieth of a second. A pair of consecutive fields constitutes a picture. The odd field contains the odd-numbered lines of the picture and the even field contains the even-numbered lines of the picture. Analog video decoder 316 outputs the corresponding sequence of digitized pictures and respective digitized audio. Each picture is a two dimensional entity of picture elements and each picture element contains a respective set of values. A picture element value comprises luminance and chrominance information that are representative of brightness and color information at the spatial location of the picture element within the picture.

Digitized pictures and respective audio output by analog video decoder 316 are presented at the input of compression engine 317. Digitized pictures and respective audio output by analog video decoder 316 can also be presented to an input of media engine 322 via an interface (not shown) dedicated for non-compressed digitized analog video and audio, such as ITU-656, for display on TV 341. Compression engine 317 is coupled to localized memory 349, preferably DRAM 352, for input and processing of the input digitized pictures and their respective digitized audio. Alternatively, compression engine 317 can have its own integrated memory (not shown). Compression engine 317 processes the sequence of digitized pictures and digitized audio and converts them into a video compressed stream and an audio compressed stream, respectively. The compressed audio and video streams are produced in accordance with the syntax and semantics of a designated audio and video coding method, such as specified by the MPEG-2 audio and MPEG-2 video ISO standard, so that they can be interpreted by video decoder 323 and audio decoder 325 for decompression and reconstruction at a future time. Each compressed stream consists of a sequence of data packets containing a header and a payload. Each header contains a unique program identification, or PID, associated with the respective compressed stream.

Compression engine 317 multiplexes the audio and video compressed streams into a transport stream, such as an MPEG-2 transport stream, for output. Furthermore, compression engine 317 can preferably compress audio and video corresponding to more than one program in parallel (e.g., two tuned analog TV signals) and to multiplex the respective audio and video compressed streams into a single transport stream. Output of compressed streams and/or transport streams produced by compression engine 317 is input to signal processing system 314. Parsing capabilities 315 within signal processing 314 allow for interpretation of sequence and picture headers, for instance, annotating their locations within their respective compressed stream for future retrieval from storage device 373. A compressed analog media content instance (e.g., TV program episode, or show) corresponding to a tuned analog transmission channel can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 for its display on TV 341, as will be described below.

Demultiplexing system 315 can include MPEG-2 transport demultiplexing. When tuned to carrier frequencies carrying a digital transmission signal, demultiplexing system 315 enables the separation of packets of data, corresponding to the compressed streams of information belonging to the desired media content instances, for further processing. Concurrently, demultiplexing system 315 precludes packets in the multiplexed transport stream that are irrelevant or not desired, such as packets of data corresponding to compressed streams of media content instances of other media content signal sources (e.g. other TV channels), from further processing.

Parsing capabilities of demultiplexing system 315 include reading and interpreting the received transport stream without disturbing its content, such as to interpret sequence and picture headers, for instance, to annotate their locations within their respective compressed stream for future retrieval from storage device 373. Thus, the components of signal processing system 314 are capable of QAM demodulation, forward error correction, and demultiplexing MPEG-2 transport streams, and parsing packetized elementary streams and elementary streams. A compressed media content instance corresponding to a tuned carrier frequency carrying a digital transmission signal can be output as a transport stream by signal processing 314 and presented as input for storage in storage device 373 via interface 375 as will be described below. The packetized compressed streams can be also output by signal processing 314 and presented as input to media engine 322 for decompression by video decompression engine 323 and audio decompression engine 325 as will be described below.

One having ordinary skill in the art will appreciate that signal processing system 314 will preferably include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention, including analog signals (e.g. NTSC) that bypass one or more elements of the signal processing system 314 and are forwarded directly to the output system 348. Further, outputs presented at corresponding next-stage inputs for the aforementioned signal processing flow may be connected via accessible memory 349 in which the outputting device stores the output data and the inputting device thereafter inputs the output data written to memory 349 by the respective outputting device. Outputting and inputting devices include analog video decoder 316, compression engine 317, media engine 322, signal processing system 314, and components or subcomponents thereof. Further, it will be understood by those having ordinary skill in the art that components of signal processing system 314 can be spatially located in different areas of the DHCT 16. Further, it will be understood by those having ordinary skill in the art that, although the components of signal processing system 314 are illustrated as being in communication with an incoming signal from the communications interface 342, the signal may not necessarily be in the order shown for all signals.

The DHCT 16 also includes media engine 322, which includes digital video decoder 323 also known as video decompression engine, and digital audio decoder 325 also known as audio decompression engine, and other digital signal processing components not shown., as would be appreciated by those having ordinary skill in the art. For example, demultiplexing system 315 is in communication with tuner system 345, and processor 344 to effect reception of digital compressed video streams, digital compressed audio streams, and data streams corresponding to one or more media content instances to be separated from other media content instances and/or streams transported in the tuned transmission channel and to be stored in a first part (not shown) of DRAM 352 of DHCT 16 assigned to receive packets of one or more media content instances. Other dedicated memory may also be used for media content instance packets.

Furthermore, while conducting this process, demultiplexing system 315 demultiplexes and separates desired compressed streams from the received transport stream without disturbing its content. Further, parser 315 parses (i.e., reads and interprets) compressed streams such as to interpret sequence headers and picture headers, and deposits a transport stream carrying compressed streams of a first media content instance into DRAM 352. Processor 344 causes transport stream in DRAM 352 to be transferred to the storage device 373 via interface 375. Under program control by processor 344, the demultiplexing system 315 in communication with the digital video decoder 323, storage device 373, and processor 344 effect notification and/or transfer of received packets of one or more compressed streams corresponding to one or more media content instances from a first part of DRAM 352 to a second part (not shown) of DRAM 352 assigned to the digital video decoder 323 and the digital audio decoder 325. Alternatively, media engine 322 can have access to a dedicated localized DRAM (not shown). Upon demultiplexing and parsing the transport stream carrying one or more media content instances, signal processing system 314 outputs to DRAM 352 ancillary data in the form of a table or data structure (not shown) comprising the relative or absolute location of the beginning of certain pictures in the compressed media content instance for convenience in retrieval during future operations.

In another embodiment, according to a plurality of tuners, and respective number of demodulating systems 313, demultiplexing systems 315, and signal processing systems 314, a respective number of broadcast digital media content instances are received and routed to the hard disk 300 of storage device 373 simultaneously. Alternatively, a single demodulating system 313, a single demultiplexing system 315, and a single signal processing system 314, each with sufficient processing capabilities can serve to process more than one digital media content instance.

In another embodiment according to the aforementioned description, a first tuner of tuning system 345 receives an analog video signal corresponding to a first media content instance and a second tuner simultaneously receives a digital compressed stream corresponding to a second media content instance. First media content instance is processed as an analog video signal and second media content instance is processed as a digital compressed stream as described above.

In one implementation, compression engine 317 can output formatted MPEG-2 or MPEG-1 packetized elementary streams (PES) inside a transport stream, all compliant to the syntax and semantics of the ISO MPEG-2 standard. Alternatively, compression engine 317 can output other digital formats that are compliant to other standards. The digital compressed streams output by compression engine 317 corresponding to a media content instance are deposited in local memory for compression engine 317 and routed to demultiplexing system 315. Demultiplexing system 315 parses (i.e., reads and interprets) the transport stream generated by compression engine 317 without disturbing its content, such as to interpret picture headers, and deposits the transport stream into DRAM 352. Processor 344 causes transport stream in DRAM 352 to be transferred to the storage device 373. While parsing the transport stream, demultiplexing system 315 outputs to memory 352 ancillary data in the form of a table or data structure (not shown) comprising the relative or absolute location of the beginning of certain pictures in the compressed media content stream for the media content instance for convenience in retrieval during future operations. In this way, random access operations such as fast forward, rewind, and jumping to a location in the compressed media content instance can be attained.

In another embodiment, according to a plurality of tuners, a respective number of analog video decoders 316, and a respective number of compression engines 317, the aforementioned compression of analog video and audio is performed and routed to hard disk 300 of the storage device 373 simultaneously for a respective number of analog media content instances. Alternatively, a single compression engine with sufficient processing capabilities can serve to compress more than one analog media content instance.

The DHCT 16 may also include one or more wireless or wired interfaces, also called communication ports 374, for receiving and/or transmitting data to other devices. For instance, the DHCT 16 may feature USB (Universal Serial Bus), Ethernet (for connection to a computer), IEEE-1394 (for connection to media content devices in an entertainment center), serial, and/or parallel ports. The user inputs may be, for example, provided by an input device including a computer or transmitter with buttons or keys located either on the exterior of the terminal or by a hand-held remote control device 380 or keyboard that includes user-actuated buttons, or even aural input.

The DHCT 16 includes at least one storage device 373 to provide storage for downloaded media content. Storage device 373 can be an optical storage device or a magnetic storage device, among others, and is preferably a hard disk drive. Storage device 373 comprises storage for media content and/or data that can be written to for storage and later read from for retrieval for presentation. The storage device 373 preferably includes at least one hard disk 300. Throughout this disclosure, references relating to writing to or reading from the storage device 373, or references regarding recordings from or to the storage device 373 will be understood to mean that such read or write operations are occurring to the actual medium (for example, the hard disk 300) of the storage device 373. Preferably located in each hard disk 300 is one or more time shift buffers (TSBs) 378, which comprise a plurality of clusters (as described below) for temporarily receiving media content and/or data. The storage device 373 is also comprised of a controller 379 that receives operating instructions from the device driver 311 of the operating system 353 (as described below) and implements those instructions to cause read and/or write operations to the hard disk 300. The device driver 311 communicates with the storage device controller 379 to format the hard disk 300, causing the hard disk to be divided radially into sectors 301 and concentric circles called tracks 302, as illustrated by the block diagram illustration of the example hard disk 300 in FIG. 3B. Note from FIG. 3B that the same number of sectors 301 per track 302 are illustrated, but other embodiments with a different number of tracks per side, sectors per track, bytes per sector, and in different zones of tracks, are within the scope of the preferred embodiments of the invention. The sector 301 is the basic unit of storage on the hard disk 300. In one implementation, each sector 301 of a hard disk 300 can store 512 bytes of user data. While data is stored in 512-byte sectors on the hard disk 300, the cluster, such as example cluster 303, is typically the minimum unit of data storage the operating system 353 uses to store information. Two or more sectors on a single track make up a cluster.

Referring again to FIG. 3A, storage device 373 is preferably internal to DHCT 16, coupled to a common bus through a communication interface 375, preferably an integrated drive electronics (IDE) or small computer system interface (SCSI), although IEEE-1394 or USB, among others, can be used. In other embodiments, the storage device 373 can be externally connected to (and thus removable from) the DHCT 16 via a communication port 374 implemented as IEEE-1394 or USB or as a data interface port such as a SCSI or an IDE interface. In one implementation, under the auspices of the real-time operating system 353 (as described below) and executed by processor 344, and in coordination with the personal video recording (PVR) application client 377 and the device driver 311 (the latter two components described below), downloaded media content (herein understood to also refer to other types of data, in addition to, or instead of, media content instances) are received in DHCT 16 via communications interface 342 and stored in a temporary cache (not shown) in memory 349. The temporary cache is implemented and managed to enable media content transfers from the temporary cache to storage device 373, or, in concert with the insertion of a newly arriving media content into the temporary cache. In one implementation, the fast access time and high data transfer rate characteristics of the storage device 373 enables media content to be read from the temporary cache in memory 349 and written to storage device 373 in a sufficiently fast manner. Orchestration of multiple simultaneous data transfer operations is effected so that while media content is being transferred from the cache in memory 349 to storage device 373, new media content is received and stored in the temporary cache of memory 349. In other implementations, the downloaded media content is received through communications port 374 in the DHCT 16 and then transferred directly to storage device 373, thus bypassing the temporary cache.

Processor 344 in communication generally with device driver 311 and storage device controller 379 and demultiplexing system 315 effect retrieval of compressed video streams, compressed audio streams, and data streams corresponding to one or more media content instances from storage device 373. Retrieved streams are deposited in an output cache in storage device 373 and transferred to memory 352, and then processed for playback according to mechanisms that would be understood by those having ordinary skill in the art. In some embodiments, the media content instances are retrieved and routed from the hard disk 300 to the video and audio decoding system simultaneously, and then further processed for eventual presentation on a display device or other device.

In one implementation, the DHCT 16 includes system memory 349, which includes FLASH memory 351 and dynamic random access memory (DRAM) 352, for storing various applications, modules and data for execution and use by the processor 344. Basic functionality of the DHCT 16 is provided by an operating system 353 that is primarily stored in FLASH memory 351. The operating system 353 includes, among other elements, at least one resource manager 367 that provides an interface to resources of the DHCT 16 such as, for example, computing resources. Also included within operating system 353 is one or more device drivers that provides operating instructions to an internal or external storage device, such as storage device 373, and other peripheral devices not shown. In one implementation, device driver 311 provides operating instructions to the storage device controller 379 of the storage device 373 to effect, among other functions, read and/or write operations to the hard disk 300 of the storage device 373. The device driver 311 includes several driver modules, including MPEG transport 361, audio/video (A/V) File System Manager 368, and DVR Manager 369. MPEG transport 361 provides functionality for decoding (i.e. providing operating instructions to the media engine 322 for MPEG A/V decoding) and playing A/V encoded in MPEG transport streams. A/V File System Manager 368, under control of the DVR Manager 369, enables MPEG transport 361 to effect the decoding and playback functionality by effecting retrieval of MPEG A/V media content from the storage device 373 and providing the content to the audio decoder 325 and video decoder 323 of media engine 322. AV File System Manager 368 also provides functionality for the recording of MPEG streams. The AV File System Manager 368 manages data about each recorded media content instance including where it is stored physically (i.e. cluster management, as described below) and the locations of I-Frames (a series of "still pictures" of an MPEG transport stream that the DHCT 16 can use to provide a display during rewind or fast forward operations).

The AV File System Manager 368 also provides a software generated pointer, called Normal Play Time (NPT), which points to locations within files and locations within media content instances within those files. Based on the Lightweight Stream Control Protocol, NPT can be thought of as the clock associated with a video asset (as distinguished from real-time clock (not shown) for the DHCT 16). For every file that is created for media content downloaded to the storage device 373, an NPT is generated. There is an NPT for the read head of the storage device 373 and for the write head of the storage device 373. For writing content to the storage device 373 for a newly created file (e.g. a TSB file), an NPT is created for the write head of the storage device 373 with an initial value of zero. In one implementation, the AV File System Manager 368 receives a periodic interrupt (for example every 5–10 msec) set up by the PVR application 377 through the computer services of the operating system 353. This interrupt is synchronized with the internal real-time clock (not shown) of the DHCT 16 in order to advance the pointer (i.e. the NPT) at a substantially constant rate. The NPT continues to increase in value (from an initial value of zero) until the associated file is closed. For the read head of the storage device 373, the NPT starts at 0 at the start of the file, advances in real time in normal play mode, advances faster than real time in fast forward mode, decrements in rewind mode, and is fixed when the video is paused. The DVR Manager 369 is the driver module that controls the operation of the MPEG encoding and MPEG decoding (through MPEG transport 361), and uses the services of the AV File System Manager 368 to store and provide functionality for the playback of files. It will be understood that references to the device driver 311 will include one or more, or a combination of one or more of the aforementioned device driver modules.

One or more programmed software applications, herein referred to as applications, are executed by utilizing the computing resources in the DHCT 16. The applications, or application clients, may be resident in FLASH memory 351 or downloaded (or uploaded) into DRAM 352. Applications stored in FLASH memory 351 or DRAM 352 are executed by processor 344 (e.g., a central processing unit or digital signal processor) under the auspices of the operating system 353. Data required as input by an application is stored in DRAM 352 or FLASH memory 351 and read by processor 344 as need be during the course of application execution. Input data may be data stored in DRAM 352 by a secondary application or other source, either internal or external to the DHCT 16, or possibly anticipated by the application and thus created with the application at the time it was generated as a software application, in which case it is stored in FLASH memory 351. Data generated by an application is stored in DRAM 352 by processor 344 during the course of application execution. DRAM 352 also includes application memory 370 that various applications may use for storing and/or retrieving data.

An application referred to as navigator 355 is also resident in FLASH memory 351 for providing a navigation framework for services provided by the DHCT 16. The navigator 355 registers for and in some cases reserves certain user inputs related to navigational keys such as channel increment/decrement, last channel, favorite channel, etc. The navigator 355 also provides users with television related menu options that correspond to DHCT functions such as, for example, blocking a channel or a group of channels from being displayed in a channel menu.

The FLASH memory 351 also contains a platform library 356. The platform library 356 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 356 that are shown in FIG. 3A are a window manager 359 and a service application manager (SAM) client 357.

The window manager 359 provides a mechanism for implementing the sharing of the screen regions and user input. The window manager 359 on the DHCT 16 is responsible for, as directed by one or more applications, implementing the creation, display, and deallocation of the limited DHCT 16 screen resources. It allows multiple applications to share the screen by assigning ownership of screen regions, or windows. The window manager 359 also maintains, among other things, a user input registry 350 in DRAM 352 so that when a user enters a key or a command via the remote control device 380 or another input device such as a keyboard or mouse, the user input registry 350 is accessed to determine which of various applications running on the DHCT 16 should receive data corresponding to the input key and in which order. As an application is executed, it registers a request to receive certain user input keys or commands. When the user presses a key corresponding to one of the commands on the remote control device 380, the command is received by the receiver 346 and relayed to the processor 344. The processor 344 dispatches the event to the operating system 353 where it is forwarded to the window manager 359 which ultimately accesses the user input registry 350 and routes data corresponding to the incoming command to the appropriate application.

The SAM client 357 is a client component of a client-server pair of components, with the server component (not shown) being located on the headend 11, preferably in the control system 232 (FIG. 2). A SAM database 360 (i.e. structured data such as a database or data structure) in DRAM 352 includes a data structure of services and a data structure of channels that are created and updated by the headend 11. Herein, database will refer to a database, structured data or other data structures as is well known to those of ordinary skill in the art. Many services can be defined using the same application component, with different parameters. Examples of services include, without limitation and in accordance with one implementation, presenting television programs (available through a WatchTV application 362), pay-per-view events (available through a PPV application 364), digital music (not shown), media-on-demand (available through an MOD application 363), and an interactive program guide (IPG) 397. In general, the identification of a service includes the identification of an executable application that provides the service along with a set of application-dependent parameters that indicate to the application the service to be provided. As an example, a service of presenting a television program (media content instance) could be executed by the WatchTV application 362 with a set of parameters specifying the HBO to view HBO or with a separate set of parameters to view CNN. Each association of the application component (tune video) and one parameter component (HBO or CNN) represents a particular service that has a unique service I.D. The SAM client 357 also interfaces with the resource manager 367, as discussed below, to control resources of the DHCT 16.

Application clients can also be downloaded into DRAM 352 at the request of the SAM client 357, typically in response to a request by the user or in response to a message from the headend 11. In the example DHCT 16 illustrated in FIG. 3A, DRAM 352 includes a media-on-demand application (MOD) 363, an e-mail application 365, PVR application 377, and a web browser application 366. It should be clear to one with ordinary skill in the art that these applications are not limiting and merely serve as examples for embodiments of the invention. Furthermore, one or more DRAM based applications may be resident, as an alternative embodiment, in FLASH memory 351. These applications, and others provided by the subscriber television system operator, are top-level software entities on the network for providing services to the user.

In one implementation, applications executing on the DHCT 16 work with the navigator 355 by abiding by several guidelines. First, an application utilizes the SAM client 357 for the provision, activation, and suspension of services. Second, an application shares DHCT 16 resources with other applications and abides by the resource management policies of the SAM client 357, the operating system 353, and the DHCT 16. Third, an application handles situations where resources are only available with navigator 355 intervention. Fourth, when an application loses service authorization while providing a service, the application suspends the service via the SAM (the navigator 355 will reactivate an individual service application when it later becomes authorized). Finally, an application client, or application, is designed to not have access to certain user input keys reserved by the navigator (i.e., power, channel +/−, volume +/−, etc.).

The MOD client application 363 provides the user with lists of available media content titles for each media content instance to choose from and with media content instances requested by the user. The MOD client application 363 provides media content to the user by engaging, typically, in a direct two-way IP (Internet Protocol) connection with VOD content servers (not shown) that would be located, in one embodiment, in the headend 11 (FIG. 2).

An executable program or algorithm corresponding to an operating system (OS) component, or to a client platform component, or to an application client, or to respective parts thereof, can reside in and execute out of DRAM 352 and/or FLASH memory 351. Likewise, data input into or output from any executable program can reside in DRAM 352 or FLASH memory 351. Furthermore, an executable program or algorithm corresponding to an operating system component, or to a client platform component, or to an application client, or to respective parts thereof, can reside in FLASH memory 351, or in a local storage device (such as storage device 373) externally connected to or integrated into DHCT 16 and be transferred into DRAM 352 for execution. Likewise, data input for an executable program can reside in FLASH memory 351 or a storage device and be transferred into DRAM 352 for use by an executable program or algorithm. In addition, data output by an executable program can be written into DRAM 352 by an executable program or algorithm and be transferred into FLASH memory 351 or into a storage device. In other embodiments, the executable code is not transferred, but instead, functionality is effected by other mechanisms.

Permanent recordings and other write operations of media content to the storage device 373 are primarily effected by a PVR architecture comprising the PVR application 377 and the device driver 311. At one level of abstraction, the PVR application 377 provides high-level control for writing of digital data from multiple input streams to the storage device 373 for both scheduled permanent recordings and permanent recordings from a time shift buffer (TSB) 378, or writes to the TSB 378. The TSB 378 is a configurable allocation of hard disk clusters that store the data downloaded from the data streams. More than one TSB 378 may be used, for instance, one TSB per tuner in the case of a DHCT 16 with multiple tuners. Through mechanisms explained below, media content received into the TSB 378 will have a temporary recording designation. That is, media content stored in clusters of the TSB 378 will have a temporary residence. This receiving of media content into the TSB 378 for temporary residence will also be referred to as buffering. The media content stored in the TSB 378 will either be deleted (i.e. the clusters storing the media content will be configured as writeable for eventual write operations that overwrite the media content within those clusters) or retained (through election by the user) as a permanent recording. A permanent recording will be understood to mean media content that is stored for an extended period of time as decided by the user. Permanent recordings are stored in non-buffer clusters (i.e. not in clusters of the TSB 378) that are not used for the TSB 378 in instances when the user elects in advance to make a scheduled recording of a media content instance that has not yet been tuned to at the DHCT 16. A permanent recording can also be achieved by selecting a media content instance stored in the TSB 378 and designating the media content instance as permanent. Further, when the media content instance is designated as permanent, the associated TSB clusters are configured for eventual designation as non-buffer clusters (i.e. permanent recording clusters). Thus, permanent recordings will preferably be more permanent than media content in the TSB 378, and permanent recordings can eventually be deleted from the disk space, typically at the explicit request of a user, as one example. This deletion occurs, in one implementation, by configuring the associated non-buffer clusters as writeable, and thus eventually available for the TSB 378 or scheduled recordings. As part of the high level control provided by the PVR application 377, the PVR application 377 also provides media content instance data management and user interfaces. With respect to media content instance data management, the PVR application 377 maintains the media content instance guide data on the hard disk 300 for all permanently recorded files and TSB 378 files with their associated media content.

FIG. 4A is a programming diagram of example software programming code in conventional "C" computer language that can be used to create and maintain the data structure for each media content instance received into the TSB 378 (FIG. 3A). Line 410 represents a pointer to the file in which the media content instance is located. For instance, if the media content instance is located in the TSB 378, the pointer is to the TSB file. Line 415 is a Boolean expression or "flag" indicating to the PVR application 377 (FIG. 3A) whether the media content instance is a permanent recording (and thus a Boolean value of "1") or not a permanent recording (and thus a Boolean value of "0"). Once the desired media content instance is designated as permanent, the desired media content instance temporarily remains as part of the TSB file it was initially written to, as well as being designated as a permanent recorded file. Both of these files share the same clusters storing the desired media content instance. Thus, although designated as permanent, the media content instance can still be viewed from the TSB 378 (and thus the TSB file) up until the time the cluster storing the designated media content instance is completely deallocated from the TSB 378 (and a subsequent replacement cluster is allocated for the TSB 378). In this manner, one or more permanent files can be created from the TSB file while maintaining the TSB 378 as substantially constant, as explained further below.

Figure 3B:
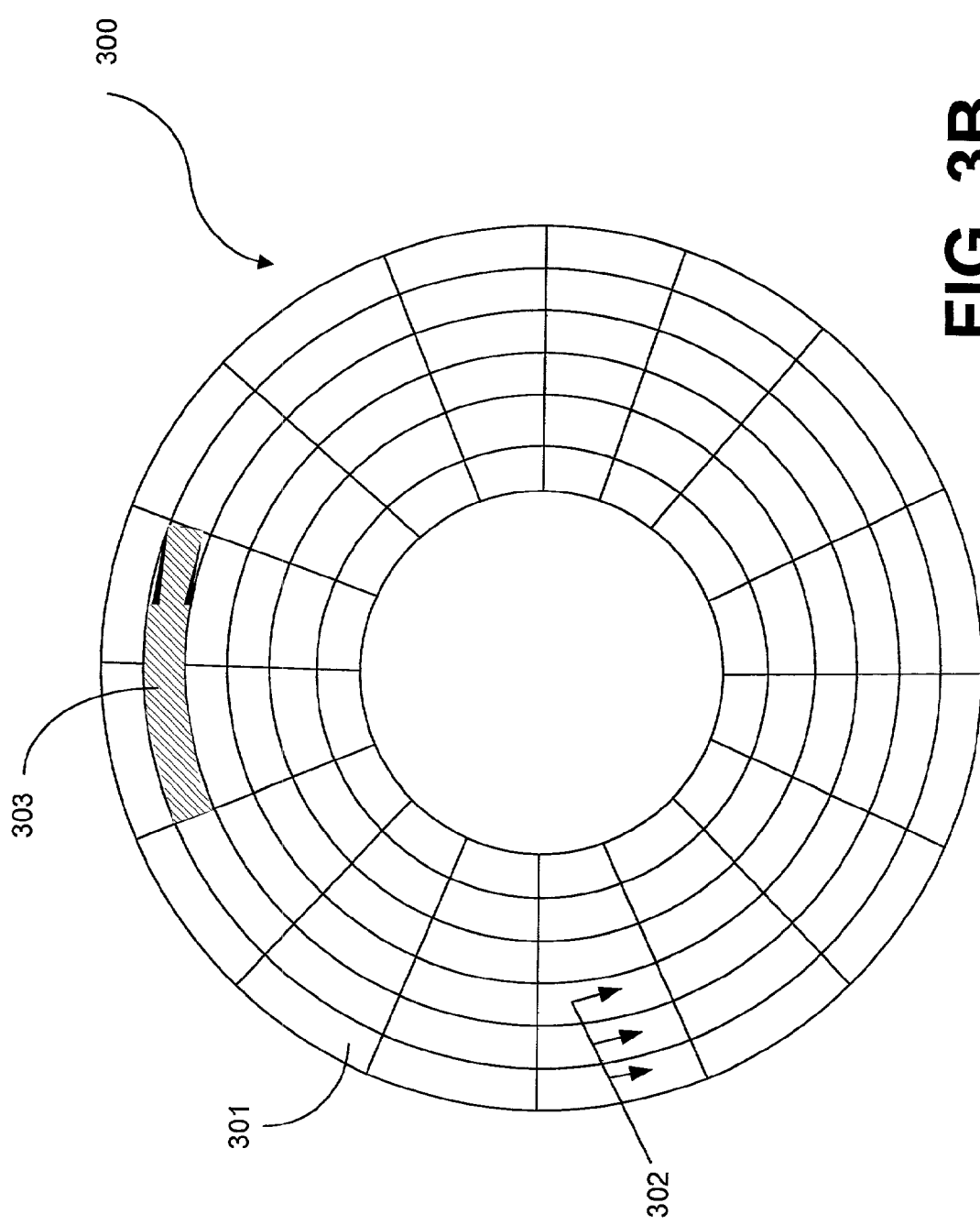
FIG. 3B is a block diagram of an example hard disk and hard disk elements located within the storage device coupled to the DHCT depicted in FIG. 3A, in accordance with one embodiment of the invention.

If the user does not choose to designate the desired media content instance as a permanent recording when the instance was first received into the TSB 378 (FIG. 3A), the user has up until immediately before the time the device driver 311 (FIG. 3A) deallocates the clusters storing the desired media content instance from the TSB 378 to choose to designate the desired media content instance as a permanent recording. Line 420 corresponds to the handle, or reference, of the TSB file. The handle is a mechanism by which the device driver 311 can access the TSB file information when the TSB file is open. Line 425 is a pointer to database records (or other data structures) containing media content instance guide information. Line 430 and line 435 correspond to the download start and end clock time (i.e. real-time), respectively, of the media content instance. Line 437 and line 440 corresponds to the starting and stopping location, in terms of NPT, of the downloaded media content instance. The device driver 311 maintains the mapping between NPT and the cluster/sector locations of media content in a separate look-up table data structure (not shown) located on the hard disk 300 (FIG. 3B). In one embodiment, the device driver 311 can sample the current write location (i.e. cluster and sector location provided by the storage device controller 379 of FIG. 3A) as the write head of the storage device 373 (FIG. 3A) advances and store that cluster and sector location in the look-up table data structure along with a corresponding NPT value. This sampling can occur, for example, every 5–10 msec. In an alternative embodiment, the device driver 311 can record an initial sample and through an interpolation algorithm estimate file locations and locations within said files. When the PVR application 377 (FIG. 3A) references a particular media content instance, the PVR application 377 passes the stored start and stop NPT values (from line 437 and 440) to the device driver 311, and the device driver 311 determines the hard disk locations from the look-up table data structure. Line 445 represents an integer value corresponding to the handle value (explained below) for the TSB file. Line items 450 and 455 correspond to the integer values for the start and stop NPT, respectively, for the TSB file containing the downloaded media content instances. Note that the programming structure described above is for every media content instance currently residing in the TSB 378. This structure can change once the buffered media content instance is made relatively permanent and eventually becomes no longer part of the TSB 378. For example, the fields tsbHandle (line 445), tsbStartNPT (line 450), and tsbStopNPT (line 455) would not necessarily be part of a programming structure describing permanently recorded media content instances that are not part of the TSB 378. FIG. 4B is a programming diagram of example software programming code in conventional "C" computer language that can be used to create and maintain a data structure consisting of an ordered list of media content instance characterizing data for each media content instance in the TSB 378 (FIG. 3A). Line item 460 provides an integer value for the handle, with "0" corresponding to a closed file. Line item 465 provides a list of data corresponding to the data structure depicted in FIG. 4A. Line item 470 provides an integer value for the starting location (NPT) of the TSB 378. Line item 475 provides the live point, or current write location to the TSB 378.

At a lower level of abstraction of the PVR architecture (i.e. for recording and read/write functionality to the storage device 373 of FIG. 3A) is the device driver 311 (FIG. 3A). The device driver 311, as part of the PVR architecture, provides for a file allocation system that provides cluster level management at the hard disk 300 (FIG. 3B). More specifically, the device driver 311 promotes the use of cross-linked clusters. Cross-linked clusters describe a situation that occurs when two files reference the same cluster. In one embodiment, the device driver 311 creates and manages a special file allocation table (FAT) to promote file sharing in individual clusters. In one embodiment, this file sharing aspect enables one or more permanently recorded files to be created from the TSB file and, according to mechanisms described below, enables a substantially constant TSB 378 to be maintained. Other benefits of file sharing include, among others, recording of full, contiguous media content instances directly from the TSB 378 (FIG. 3A) while preserving disk space and allowing the user to traverse the entire TSB 378, including shows (i.e. media content instances) designated as permanently recorded.

Figure 5A:
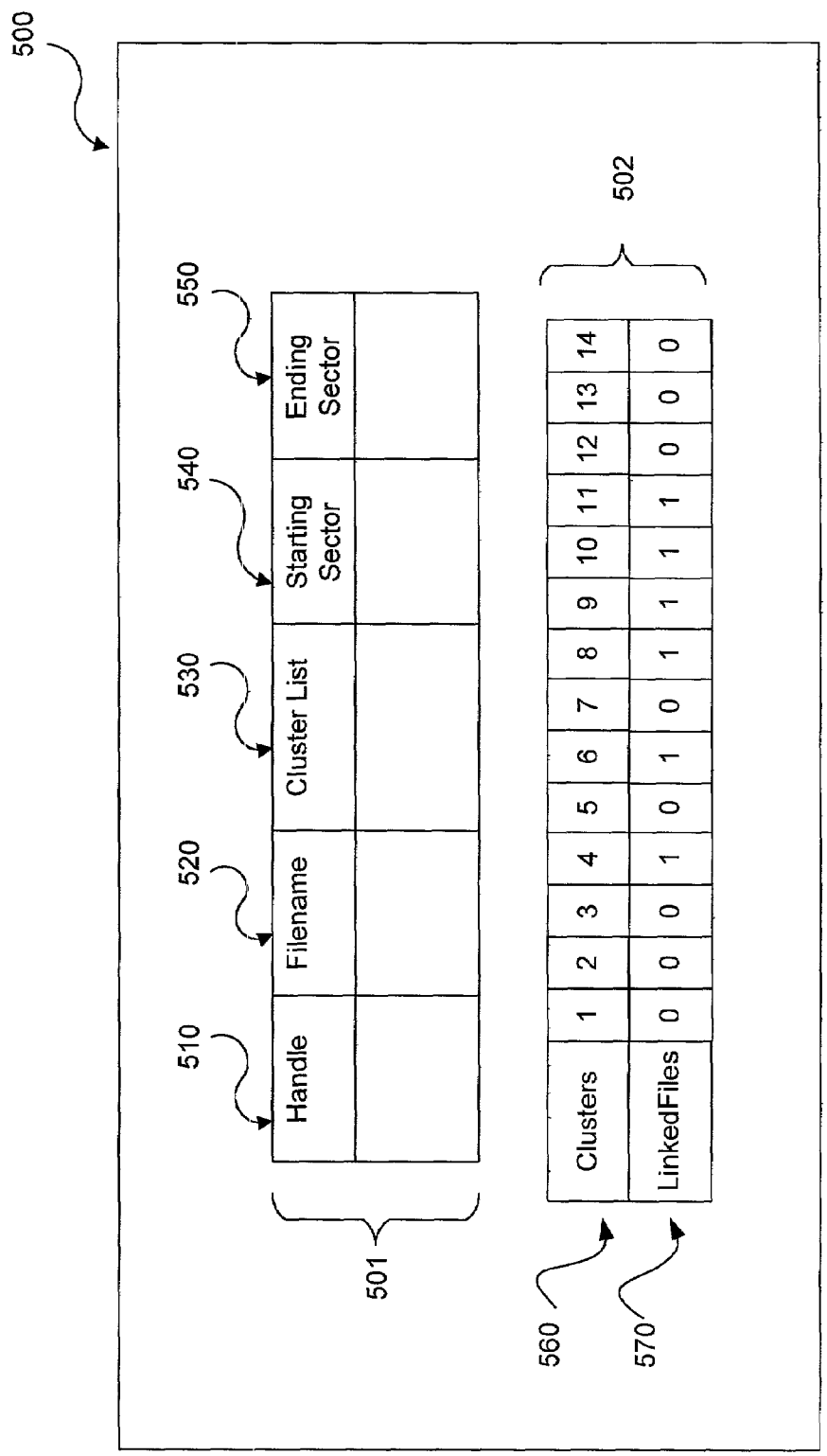
FIGS. 5A–5F are block diagram illustrations of an example file allocation table (FAT) depicting how the FAT is updated as files are created and media content instances are added or deleted, in accordance with one embodiment of the invention.

FIG. 5A is a block diagram illustration of an example FAT 500, in accordance with one embodiment of the invention. The operating system 353, device driver 311, and controller 379 (FIG. 3A) cooperate continually to create the FAT 500 and store it in one or more hard disk sectors, after which it is manipulated in DRAM 352 (FIG. 3A). With continued reference to FIGS. 3A and 3B, the controller 379 (FIG. 3A) translates commands from the device driver 311 (FIG. 3A) into voltage fluctuations that force the read/write heads (not shown) of the storage device 373 (FIG. 3A) across the hard disk 300 (FIG. 3B). The device driver 311 receives commands from the PVR application 377 (FIG. 3A) through the operating system 353 (FIG. 3A) acting as an intermediary. In other embodiments, the device driver 311 can receive instructions directly from the PVR application 377. The device driver 311 is also responsible for the initial creation of the FAT 500 at the DHCT 16 (FIG. 3A) initialization, including designating the FAT location on the hard disk 300. Maintenance of the FAT 500 includes mirroring the FAT 500 in DRAM 352 where the device driver 311 coordinates the updating of the FAT with the processor 344 (FIG. 3A). Periodically (for example, every 3–4 seconds), the processor 344 causes the FAT with its updated data to be flushed, or mirrored, back to the hard disk 300. The device driver 311 correlates locations on the hard disk 300 (FIG. 3B), communicated from the controller 379, to normal play time (NPT) values that it passes to the PVR application 377 (through the operating system 353). The PVR application 377 uses NPT values to enable the PVR application 377 to locate and permanently record media content on the hard disk 300.

The operating system 353 (FIG. 3A) maintains a directory of files and pointers to file entries in the FAT 500. The operating system 353 also synchronizes the DHCT 16 (FIG. 3A) internal clock (not shown) with the real time received from messages from the headend 11 (FIG. 2). The device driver 311 (FIG. 3A) is often considered a sub-set of the operating system 353, and one or more functions described as being performed by the device driver 311 can be, in some embodiments, performed by the operating system 353. The example FAT 500 comprises two data structures. First data structure 501 comprises a data structure of several column entries, including a filename 520, a cluster list 530, and a starting sector 540 and ending sector 550. As the TSB 378 (FIG. 3A) uses all of the sectors of the TSB 378, unlike a permanently recorded media content instance that may be "carved" out of sectors of a particular cluster, as explained below, there are no sector values maintained in 540 or 550 for TSB files. A file is created for every TSB 378 and every permanently recorded media content instance (as requested by a user or designated for permanent recording through a preference filter). The device driver 311 maintains a list of clusters for each file in the first data structure 501, as indicated by cluster list 530. Second data structure 502 of the FAT 500 comprises a list of all of the clusters of the storage device disk. The cluster entry 560 references the cluster number on the disk. Although described with two data structures, the FAT 500 may be implemented with a single data structure or more than two data structures without diverging from the scope of the preferred embodiments. Note also that in other embodiments, the filename entry 520 may be excluded from the FAT 500 and the directory entry maintained by the operating system 353, which may include pointers to the cluster list 530 for every file on the hard disk 300, may be used to associate files to the list of clusters. The LinkedFiles entry 570 indicates the number of files that share a particular cluster number. For example, if no clusters were allocated to a file, the LinkedFiles entry 570 for a particular cluster number in the cluster entry 560 would be zero ("0"). If a cluster was allocated for one file, or a portion of one file, the LinkedFiles entry 570 for that particular cluster number would be "1". If two files share the same cluster, the LinkedFiles entry 570 for that cluster number would be "2", and so on.

Figure 5B:
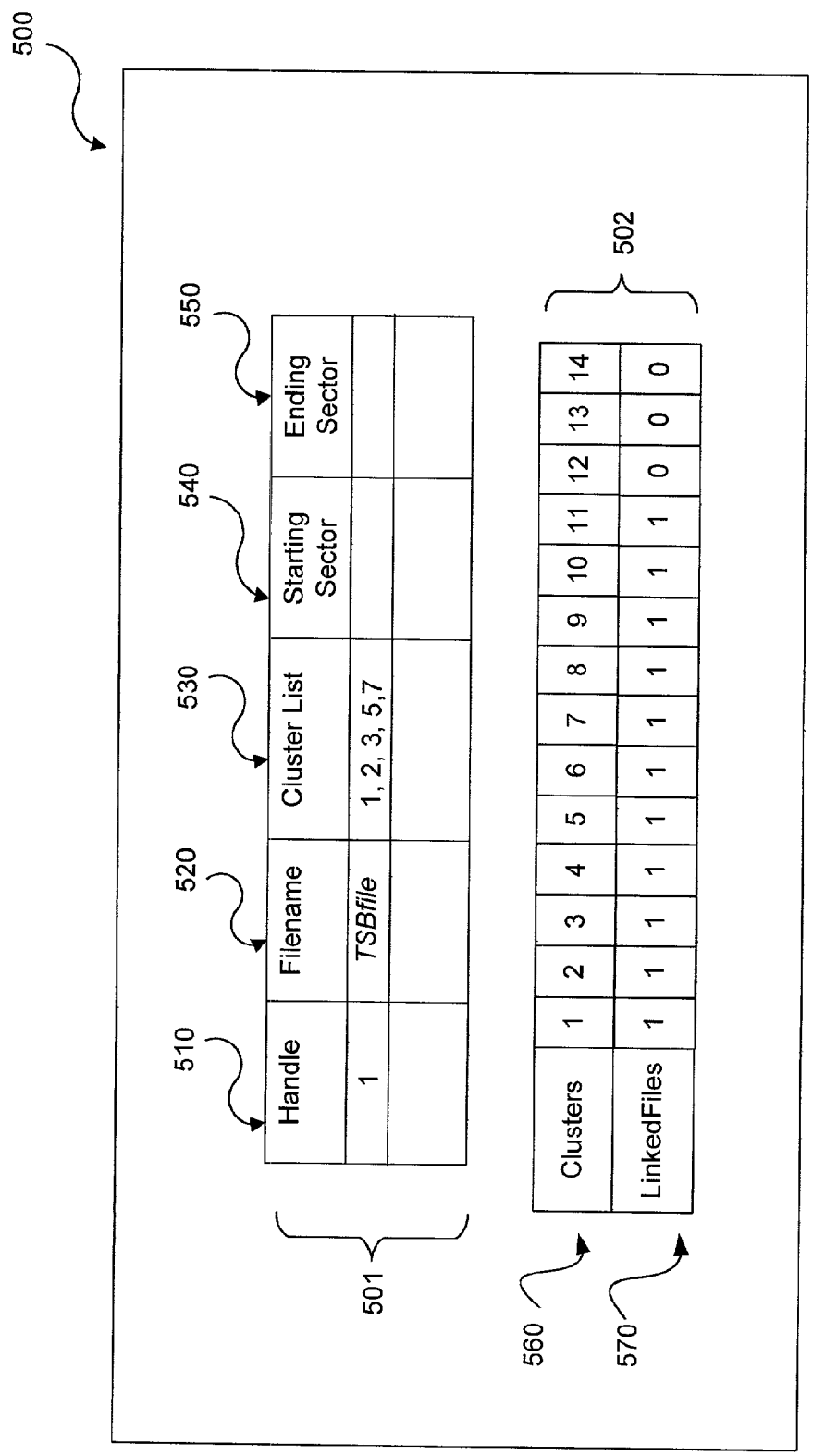

To illustrate the operative features of the FAT 500, assume the initial creation of a time shift buffer (TSB) file, or buffer file, corresponding to the buffer space, or TSB 378 (FIG. 3A), of the storage device disk space. When a TSB 378 is created, a specified number of free, or available, clusters, based on the desired TSB 378 size (e.g. gigabytes), are allocated by the device driver 311 (FIG. 3A). In one implementation, this size allocation of the TSB 378 can be user configurable via a user interface screen generated as part of a system settings menu (not shown). A default value can be communicated from the headend 11 (FIG. 2), or contained as a setting within the PVR application 377 (FIG. 3A). In response to the request of the PVR application 377 to allocate disk space for the TSB 378 under a TSB filename, the device driver 311, in communication with processor 344 (FIG. 3A), causes the FAT 500 stored in one or more sectors in the disk to be mirrored in DRAM 352 (FIG. 3A) to effect operations to the FAT 500. Periodically (for example, every 3–4 seconds), the processor 344 causes the updated FAT 500 to be "flushed" or mirrored back to the hard disk 300 (FIG. 3B). The device driver 311 searches the second data structure 502 of the FAT 500 for available clusters to allocate for the TSB 378, based on the size requirements provided by the PVR application 377. Assume, in one example, the size requirements correspond to the amount of space corresponding to 5 clusters. From the example second data structure 502 of the FAT 500 (FIG. 5A), it is noted from cluster entry 560 that clusters 1, 2, 3, 5, and 7 each have a LinkedFiles entry 570 of "0", and thus are available. Note that the LinkedFiles entries 570 for some of the other clusters include a "1" (for example, cluster 1, signifying the use of that cluster for another file (not shown) or an inoperable cluster). The device driver 311 allocates clusters 1, 2, 3, 5, and 7 for the TSB 378 and increments the LinkedFiles entry 570 for each cluster, as shown in FIG. 5B.

The clusters allocated in this example of FIGS. 5A–5F are not all adjacent clusters on the disk (e.g. 5 and 7). Thus, write operations (and read operations) are not necessarily to (or read from) contiguous clusters on a disk. Instead, clusters may be fragmented throughout the disk space for a particular file. Fragmentation is especially evident as files are shared or deleted. Although conventional software is available to defragment clusters, as is well known to those having ordinary skill in the art, the use or absence of defragmenting mechanisms do not effect the scope of the preferred embodiments of the invention. The device driver 311 (FIG. 3A) updates the first data structure 501 to reflect that a TSB 378

(FIG. 3A) is allocated in the disc space under the filename TSBfile comprising clusters 1, 2, 3, 5 and 7. When the TSBfile is open, the operating system 353 (FIG. 3A) assigns a "handle" to the TSBfile (or any open file of the hard disk 300 (FIG. 53B)). The handle is assigned (and removed when the file is closed) by the operating system 353, such that the handle exists in the operating system directory while the associated file is open, and the handle is deleted from the directory when the file is closed. The operating system 353 also maintains a pointer to the FAT first data structure 501 that includes the filename and clusters associated with the handle in the directory. Thus, when the device driver 311 allocates clusters upon receiving the command to allocate space (in terms of size, as described above) from the PVR application 377 (FIG. 3A), the device driver 311 allocates the required clusters, the operating system 353 assigns a handle to these clusters and communicates the handle to the PVR application 377.

The handle is a pointer to a file, such as TSBfile, which enables the PVR application 377 (FIG. 3A) to reference the location of the file. When the PVR application 377 seeks to identify a file to the device driver 311 (FIG. 3A), the PVR application 377 passes the handle to the device driver 311. When the TSBfile is closed, for example when the user tunes to another channel, the data structure (or record) (FIG. 4B) maintaining, among other data, the variable for the handle for that file is deleted and the handle is removed from the operating system directory. It will be understood that, in the case of multiple TSBs (for example, for multiple tuners), the same or similar aforementioned allocation and FAT updating process will occur as it does for one TSB 378 (FIG. 3A).

Media content instances are sequentially written to the allocated clusters 1, 2, 3, 5, and 7 of the TSBfile. At media content instance breaks (i.e. end of a media content instance), and when the device driver 311 (FIG. 3A) starts writing to a new cluster, the PVR application 377 (FIG. 3A) queries the device driver 311 for certain information. The PVR application 377 makes the determination as to when a particular show (i.e. media content instance) is over, in one embodiment, based on media content instance guide data the PVR application 377 stores, as will be explained in further detail below. When the PVR application 377 receives and stores the media content instance guide data, the PVR application 377 sets up a timer interrupt (or in other embodiments, polls the operating system 353) with the operating system 353 (FIG. 3A). The operating system 353, in coordination with a real-time clock (not shown) within the DHCT 16 (FIG. 3A), alerts the PVR application 377 (FIG. 3A) to the scheduled end time of the received media content instance (and the start of the next media content instance). The PVR application 377 passes to the device driver 311 the handle of the file being written to (in this example, "1" for the TSBfile), and the device driver 311 responsively communicates to the PVR application 377 the current write location (in NPT), and the stopping and starting location (in NPT) corresponding to the stop location of the completed media content instance and the start of a new media content instance, respectively. Assume a user has decided to permanently record one of the media content instances out of the TSB 378 (FIG. 3A). The user can rewind through the TSB 378 to view the buffered (i.e. temporarily recorded) media content instances on a screen display (as will be described in greater detail below). Alternatively, the user can be presented with a list of buffered media content instances resident in the TSB 378 (and encompassed by TSBfile) with a selection entry to request a permanent recording.

Figure 5C:
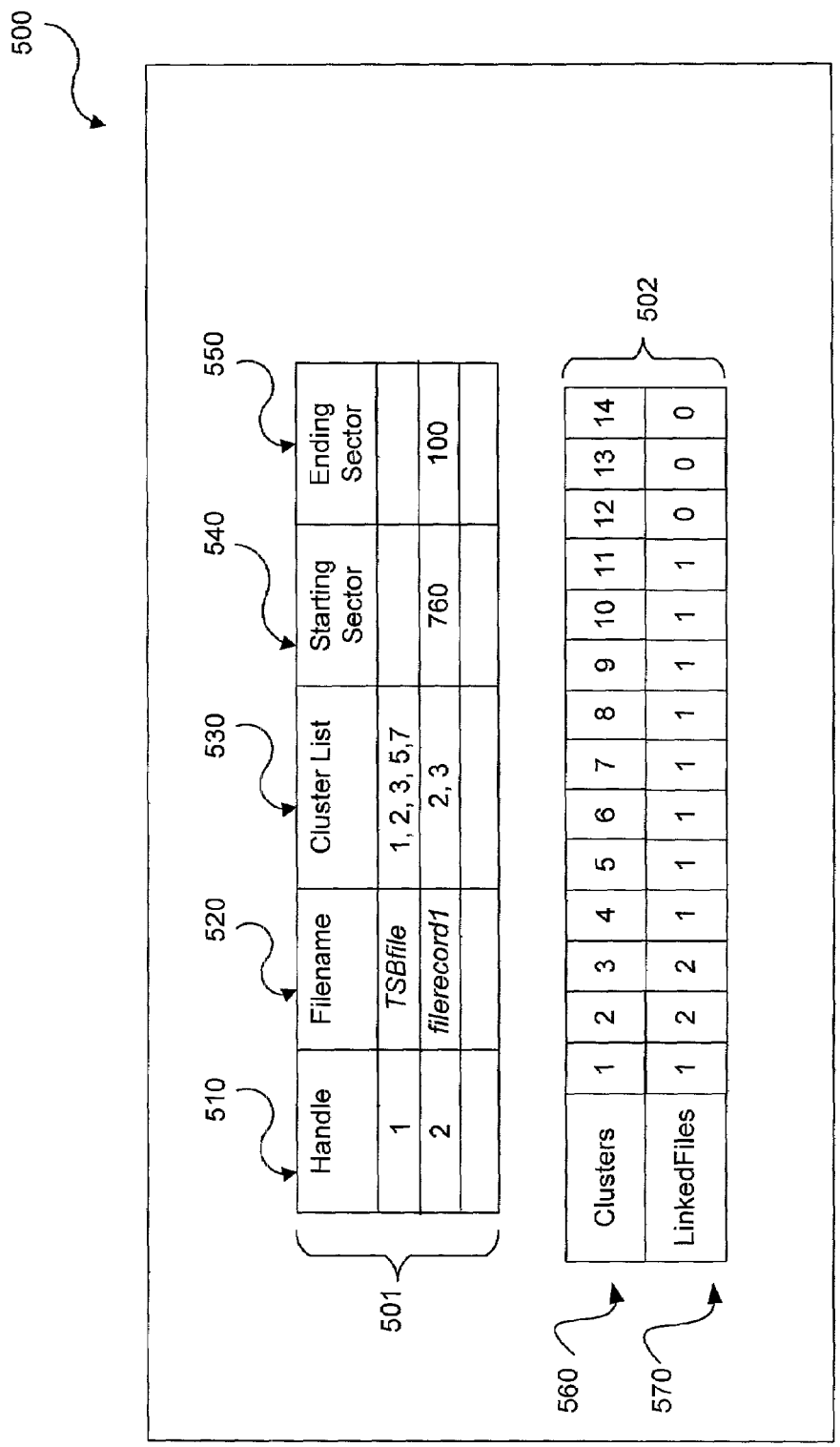

Once the user reaches the real-time playback position of a media content instance in the TSB 378 (FIG. 3A), the user can select playback or record from, for example, an input device such as remote control device 380 (FIG. 3A). The PVR application 377 provides the device driver 311 with the TSBfile handle and the start and end location (in NPT) of the requested media content instance (as previously provided by the device driver 311). The PVR application 377 (FIG. 3A) requests that the desired media content instance be recorded under a filename, for example filerecord1. The operating system 353 (FIG. 3A) returns to the PVR application 377 the handle to filerecord1 and the device driver 311 (FIG. 3A) returns the start and calculated stop location (in NPT as described below) of the permanently recorded media content instance to the PVR application 377 as well. As shown in FIG. 5C, the device driver 311 uses the location information of the desired media content instance from the PVR application 377 and updates the FAT 500. The update includes entering the filename filerecord1, and the clusters and sectors corresponding to the start and end location of the permanently recorded media content instance (assume the desired media content instance is encompassed by clusters 2 and 3). It will be understood that the choice of sector location values and clusters in FIGS. 5B through 5F are arbitrary and chosen for the sake of illustrating that the FAT 500 is continuously updated upon allocation and deallocation of clusters. Further, the device driver 311 updates the second data structure 502 by incrementing the LinkedFiles entry 570 to "2" for the affected cluster entries 560 (here, 2 and 3), reflecting the fact that the corresponding clusters are shared by two files (TSBfile and recordfile1). The "2" (or any LinkedFiles entry 570 greater than "1") for a cluster in the TSB 378 will alert the device driver 311 that no attempts should be made by the device driver 311 to automatically delete the media content instance stored in that cluster after a shift in the TSB (i.e., as new clusters are written to).

Figure 5D:
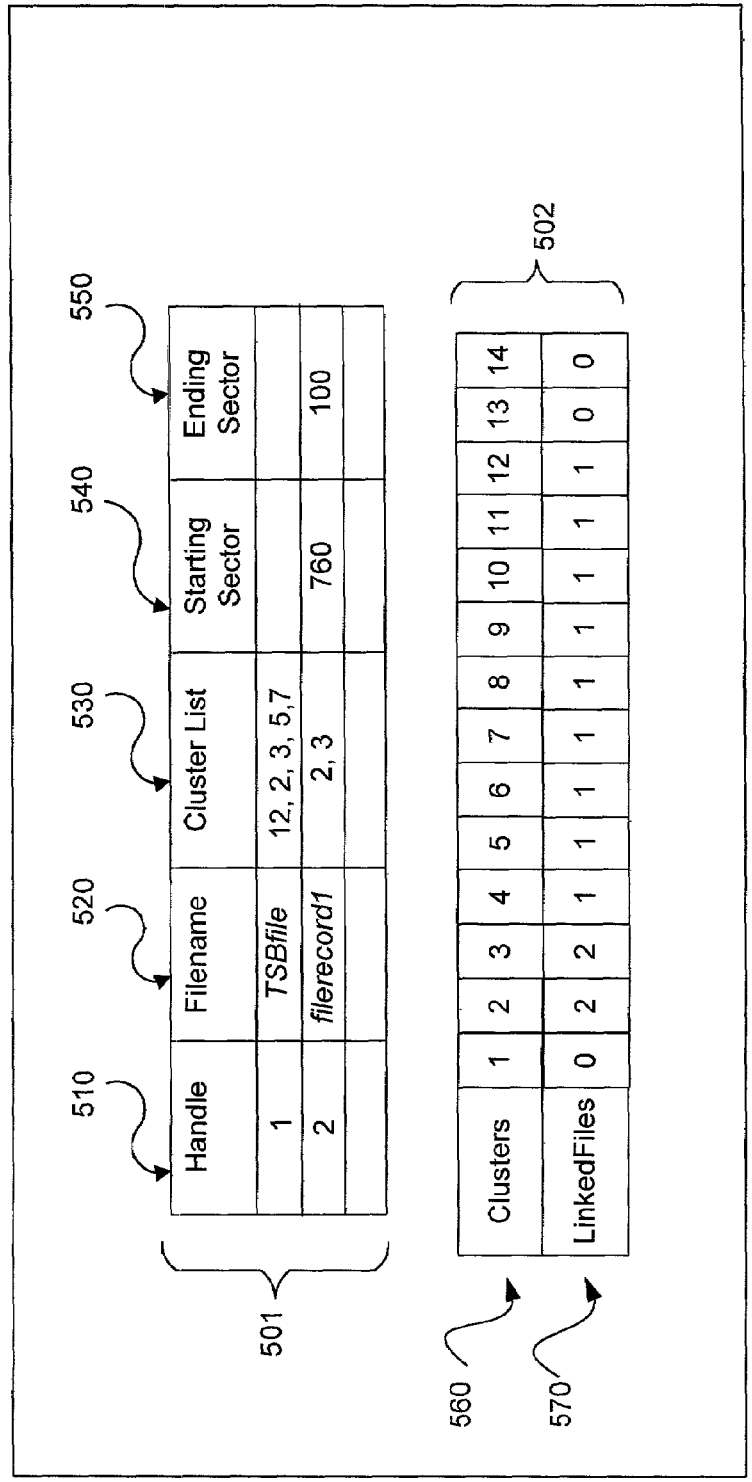

As the TSB 378 shifts (i.e. herein understood to mean as the device driver 311 (FIG. 3A) advances its write position to the hard disk 300 (FIG. 3B)), the device driver 311 will continuously update the FAT 500 first data structure 501 cluster list 530 to reflect the fact that new clusters are continuously being allocated for the TSB 378. When the TSB capacity is about to be exceeded, the device driver 311 will allocate new clusters to replace the oldest deallocated clusters. For example, and referring to FIG. 5C, cluster 1 has a LinkedFiles entry 570 of "1", thus indicating to the device driver 311 that cluster 1 shares no other files with TSBfile (i.e. no permanently recorded files). Thus, once the TSB capacity is substantially reached, cluster 1 will be deallocated and decremented (i.e. its LinkedFiles entry 570 decremented) by the device driver 311. Further, the device driver 311 searches the FAT 500 for another available cluster (i.e. a cluster with a LinkedFiles entry 570 of "0"). Cluster 12 is the next available cluster (i.e. it has a LinkedFiles entry 570 of zero), and thus cluster 12 will be allocated for the TSB 378. Alternatively, cluster 1, now with a LinkedFiles entry 570 of "0", could be re-allocated to the TSB 378. FIG. 5D illustrates the changes to the FAT 500 resulting from the device driver deallocating cluster 1 and allocating cluster 12 for the TSB 378. As noted, the device driver 311 decrements the LinkedFiles entry 570 of cluster 1 to zero, making it available for later write operations, and increments the LinkedFiles entry 570 of cluster 12 to "1". Further, the first data structure 501 is also updated with the new cluster list.

Figure 5E:
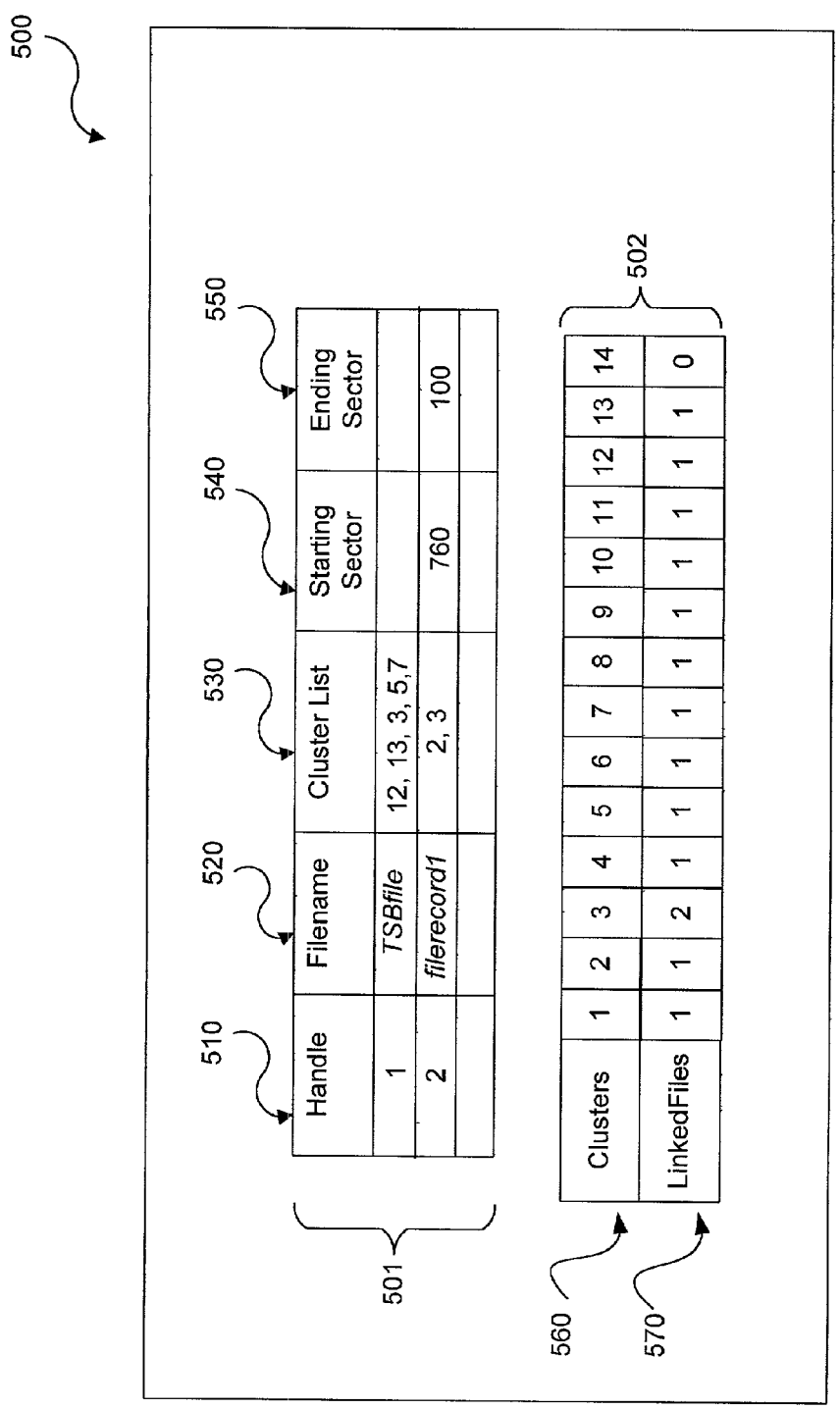
Figure 5F:
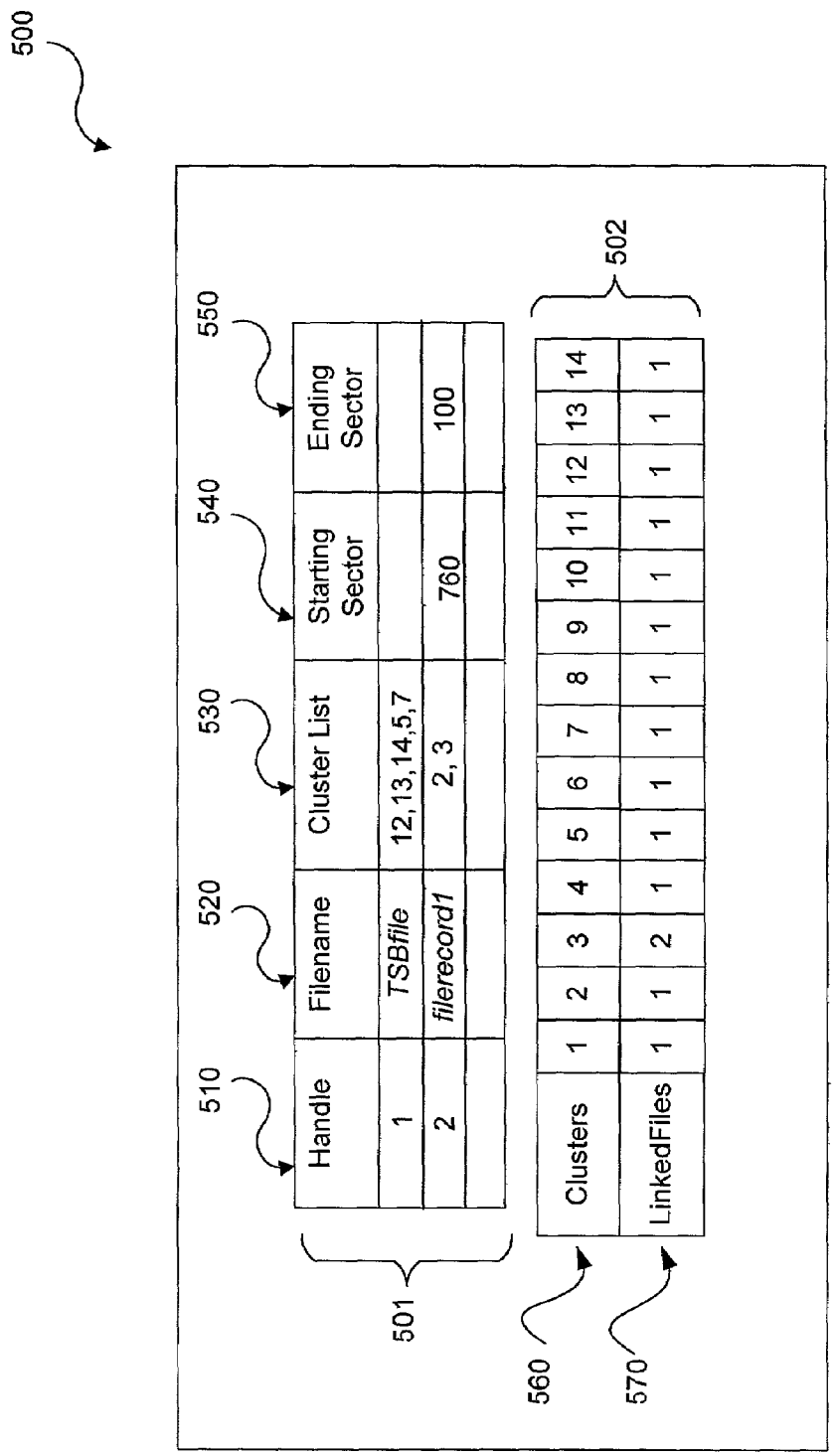

As the TSB 378 (FIG. 3A) shifts, the device driver 311 (FIG. 3A) notes from the FAT 500 that the next cluster (i.e. cluster 2) includes a LinkedFiles entry 570 of "2" as a result of part of filerecord1 sharing cluster 2 with TSBfile. The "2" in the LinkedFiles entry 570 is a notice to the device driver 311 that the media content instance encompassed by this cluster is not to be deleted. The device driver 311 searches the FAT 500 for an available replacement cluster for cluster 2. As indicated in the second data structure 502 of FIG. 5D, cluster 13 is available (i.e. has a LinkedFiles entry 570 of "0"). The device driver 311 allocates cluster 13 as a TSB cluster (i.e. encompassed by TSBfile), and increments the LinkedFiles entry 570 for cluster 13 to "1" as indicated in FIG. 5E. Cluster 2 is removed by the device driver 311 from the TSB 378 and its LinkedFiles entry 570 is decremented (from "2" to "1"). Cluster list 530 in first data structure 501 is also updated by the device driver 311 to reflect the removal of cluster 2 and the allocation of the cluster 2 replacement, cluster 13. As the TSB 378 shifts, cluster 3 is eventually removed (and its LinkedFiles entry 570 decremented to "1"), with a corresponding allocation of another cluster (cluster 14) and a FAT 500 update as illustrated in FIG. 5F. Thus, through a combination of this file sharing aspect and the allocation and deallocation of clusters based on maintaining this file sharing counter or file sharing count (e.g. LinkedFiles entry 570), permanently recorded files are created from the TSB file while maintaining the TSB 378 as substantially constant.

FIGS. 6A–6C are programming diagrams of example software programming code in conventional "C" computer language managed by the device driver 311 (FIG. 3A). FIG. 6A is a program diagram of example software programming code in conventional "C" computer language corresponding to the LinkedFiles entry 570 of the second data structure 501 of the FAT depicted in FIG. 5A. As discussed previously, any time a cluster is provisioned with a file (for example, TSBfile or filerecord1), the "numlinkedFiles" value of the affected cluster is incremented. In the example structure depicted in FIG. 6A, the "numlinkedFiles" corresponds to the Linked-Files entry 570 (FIG. 5A). When the cluster is deallocated (for example, in the case of when a media content instance previously written to the TSB 378 (FIG. 3A) is deleted, or a media content instance in the TSB 378 is converted to a permanent recording), the "numLinkedFiles" value For the associated deallocated cluster is decremented. Free, or available, clusters are clusters that are not linked to any file. The "numLinkedFiles" value for free clusters equals "0". As indicated previously, the device driver 311 maintains a list of its allocated clusters in cluster list 530 of first data structure 501. For a permanently recorded file, the cluster list 530, starting sector 540 and ending sector 550 of first data structure 501 represents an ordered list of clusters used, the start sector in the first cluster indicating the beginning of the permanently recorded file, and the ending sector in the last sector indicating the end of the permanently recorded file, respectively. This data structure can be represented by the example "C" programming depicted in FIG. 6B. FIG. 6C illustrates example "C" programming for a FAT first data structure 501 (FIG. 5B) for the TSB file that represents the list of clusters used for the programming information (i.e. for each media content instance). As distinguished from the data structure in FIG. 6B, there is no start and stop position for the TSB 378. All of the sectors in all of the TSB clusters are reserved for the TSB 378. For a permanently recorded file, the beginning of a show might not be in the first sector of a cluster (similarly, the end of a show might not be in the last sector of a cluster). Thus, a "startingSector" and "endingSector" are maintained for "RecordedFileInfo" (FIG. 6B). Alternatively, the starting and ending sector of the TSB 378 at any point in time can be maintained in the data structure of the FAT.

To create a TSB 378 (FIG. 3A), the PVR application 377 (FIG. 3A) invokes a driver applications programming interface (API), which returns a handle (i.e. pointer) to the TSB 378, as described above. FIG. 7A is an example driver API to accomplish this function. The API of FIG. 7A is a "call" made by the PVR application 377 to the device driver 311 (FIG. 3A). The device driver 311, in one implementation, creates a TSBfileInfo data structure (FIG. 6C) in response to the API of FIG. 7A and the operating system 353 assigns a handle which can be returned to the PVR application 377. The PVR application 377 can save this handle in its data structure (FIG. 4B, Line 460). The API of FIG. 7A also causes the device driver 311 to allocate the clusters and update the FAT for the clusters allocated to the TSB 378. Note that the "ui32" is the data type for the handle. It represents an unsigned integer of 32 bits. The element "tvId" is a variable of type TV_ID, which contains data the device driver 311 uses to ascertain the source of the data to the TSB 378.

To create a file for stand-alone, or scheduled, (permanent) recordings, another device driver API can be invoked by the PVR application 377 (FIG. 3A), such as example API in FIG. 7B. Generally, this stand-alone recording API takes a filename and a quality level and returns a handle to the created file. Similar to the implementation discussed for the API of FIG. 7A, the device driver 311 creates a "RecordedFileInfo" data structure (FIG. 6B) in response to the API of FIG. 7B and the operating system 353 (FIG. 3A) assigns a handle which can be returned to the PVR application 377. The PVR application 377 can save this handle in a scheduled recording data structure (not shown). A "filename" is the name of the file that is specifically recorded to for the scheduled recording. The "filename" is specified to the device driver 311 (FIG. 3A) by the PVR application 377 (FIG. 3A) and the operating system 353 returns a handle to the PVR application 377. The handle is used for all subsequent calls to the device driver 311 pertaining to that file. The "quality" element specifies the encoding quality or bit-rate (good, better, best) similar to LP, SLP, and SP for conventional video taping. The "ui32" and "tvId" elements are as described with regards to FIG. 7A.

An API which creates a new file from existing clusters in the TSB 378 (FIG. 3A) could be represented by the example "C" programming structure illustrated in FIG. 7C. As will be explained below, the user can rewind into the TSB 378 and choose to permanently record a media content instance (i.e. designate a media content instance as a permanent recording). The PVR application 377 (FIG. 3A) receives a key press event from a remote control device 380 (FIG. 3A) corresponding to the user selecting the "record" button (and processed by the operating system 353 and window manager, as described in association with FIG. 3A). The PVR application 377 invokes the API in FIG. 7C, which passes the open TSB file handle ("tsbHandle") and the start ("startNPT") and stop ("stopNPT") location of the desired media content instance (i.e. media content instance targeted to be designated as a permanent recording) to the device driver 311 (FIG. 3A). The API of FIG. 7C creates a new permanent recording file ("filename") and causes the device driver 311 to create a corresponding entry in the FAT with the assigned clusters from the TSB file, and the operating system 353 returns the handle for the permanent recording file to the PVR application 377. In other words, the device driver 311 creates a "Recorded FileInfo" structure (as depicted in FIG.

6B) for this new permanent recording file based on the start and stop NPT of the media content instance and the handle of the TSB 378. The pointer to the TSB location is represented by "tsbHandle". The handle is used to specify which TSB 378 to make the recording from. The device driver 311 passes back the calculative location (NPT values) for the new permanent recording file to the PVR application 377 as requested by the PVR application 377. The device driver 311 calculates the new values based on the NPT values passed by the PVR application 377. The device driver 311 determines the duration of the permanently recorded file by subtracting the "startNPT" from the "stopNPT" value. Then, the device driver 311 assigns the NPT duration to the "stopNPT" of this new file, and assigns the "startNPT" to zero. The device driver 311 then passes the new locations back to the PVR application 377 for storage in a data structure for permanent recordings, similar in structure to that described for the data structure of FIG. 4A. After the new permanently recorded file is created, the active playback file is still the TSB file (e.g. TSBfile). The newly created permanently recorded file is open also. Although it is not actively being written to or read from, it can share clusters with the TSB file that is being read from. The user can still perform trick modes and play from the same TSB 378, including data that is in the new permanently recorded file. Thus, the user can navigate through the TSB (e.g. using "trick modes") and still view material that the user has marked as permanently recorded.

Figure 8A:
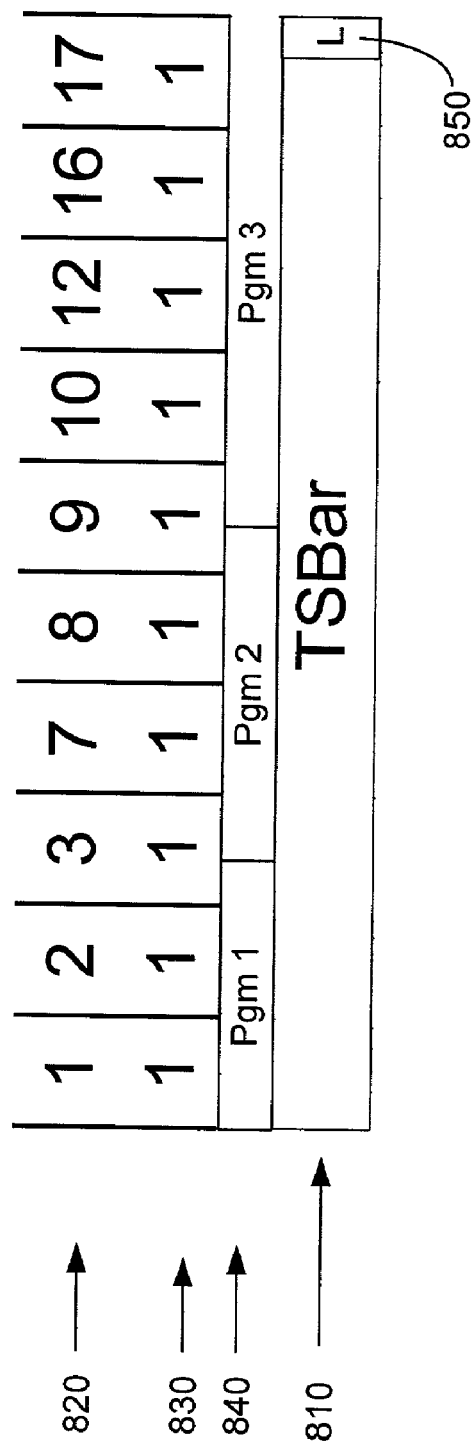
FIGS. 8A–8C are block diagram illustrations depicting how the device driver manages the cluster allocation and deallocation for media content instances downloaded to the TSB, in accordance with one embodiment of the invention.

FIGS. 8A–8D provide block diagram illustrations of how the device driver 311 (FIG. 3A) manages the cluster allocation and deallocation for media content instances downloaded to the TSB 378 (FIG. 3A). By continuously and automatically deallocating and allocating clusters, the device driver 311 (FIG. 3A) can maintain the TSB file (and thus the TSB 378) as substantially constant. Referring to FIG. 8A, assume that clusters are allocated for the TSB 378, similar to the manner described previously in association with FIG. 5B, and that the size of the TSB 378 equals ten clusters. TSBar 810 represents the TSB 378. The TSBar 810 is represented as shifting as time progresses. The shifting is in fact the continually advancing write position to the disk space, as described above. TSBar 810 also includes live point "L" 850 corresponding to the current write position to the TSB 378. LinkedFiles entry 830 and cluster entry 820 are the second structure entries of the FAT 500 as described in FIG. 5A. In this example, the initial cluster list for the TSB 378 includes, in order, clusters 1, 2, 3, 7, 8, 9, 10, 12, 16, and 17. The "1" in the LinkedFiles entry 830 is the number provided by the device driver 311 when allocating clusters to the TSB 378. The number "1" under this aforementioned list of clusters (e.g. 1, 2, etc.) indicates that these clusters are associated with one file (here, the TSB file), and share no other files. Downloaded media content instances are temporarily written to the TSB 378, starting at cluster 1, then proceeding to cluster 2, and then progressing through each cluster through cluster 17. Thus, each cluster is associated with one or more media content instances, as indicated by program (media content instance) row 840 in FIG. 8A. The open end of the box representing Program 3 (i.e. media content instance 3) indicates that Program 3 is still in process of being written to the TSB 378, and has not been completely downloaded to the TSB 378 yet.

Figure 8B:
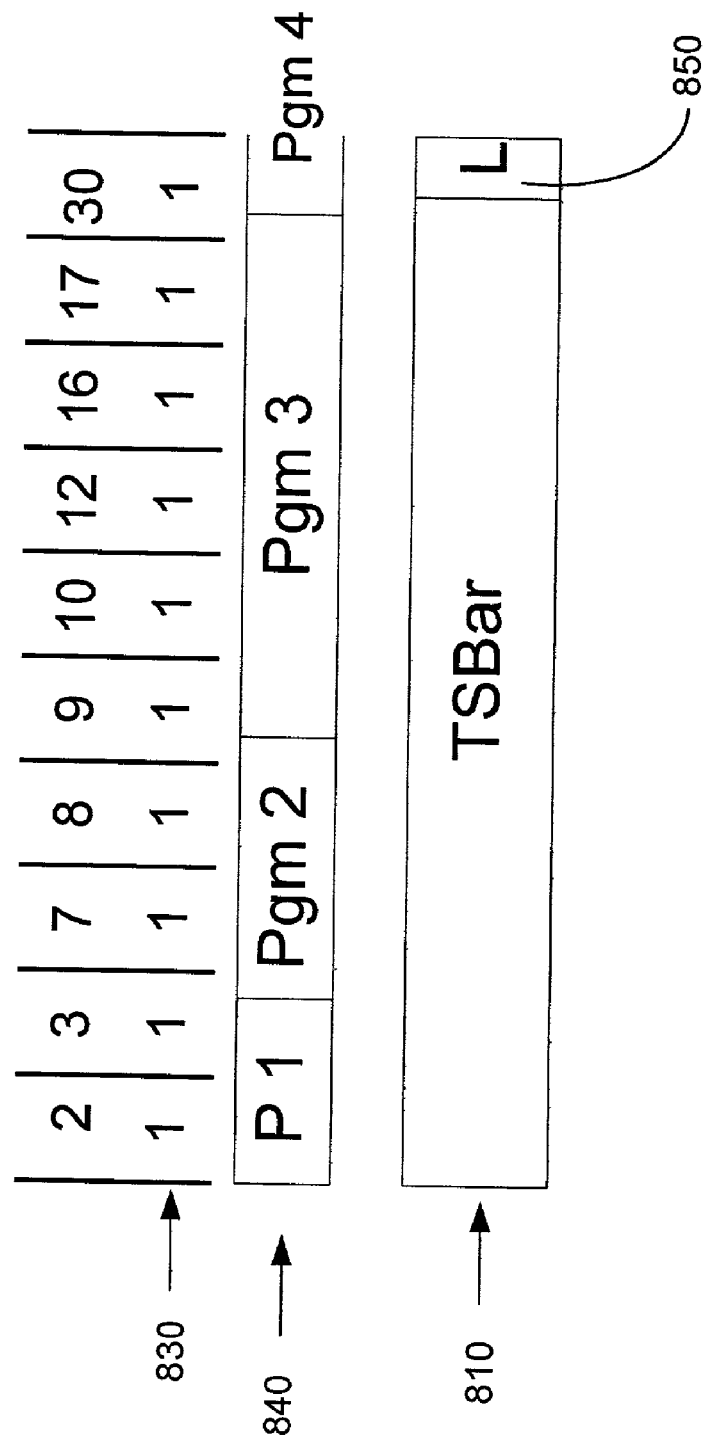

The device driver 311 (FIG. 3A) automatically maintains the TSB 378 (FIG. 3A) as substantially constant in size through a process of tracking the write locations and deallocating and allocating clusters. The device driver 311 maintains an ordered list of clusters in the FAT, as described above, and thus knows, based on the TSB size requirement or capacity, to automatically deallocate clusters storing media content in the TSB file and allocate replacement clusters to continue writing media content to the TSB file when the TSB capacity is about to be exceeded. After writing Program 3 to cluster 17, the device driver 311 automatically advances its write position and automatically deallocates the cluster storing the oldest downloaded media content instance in the TSB 378 and reallocates a replacement cluster to continue the writing of Program 3, as illustrated in FIG. 8B. This process occurs without intervention or further instruction (i.e. autonomously) from the PVR application 377 (FIG. 3A). Cluster 1 has a value for the LinkedFiles entry 830 of "1", as shown in FIG. 8A, and thus as the TSB capacity is about to be exceeded, the device driver 311 will deallocate cluster 1 from the TSB 378 and decrement the value in its LinkedFiles entry 830 (herein, LinkedFiles value), resulting in a LinkedFiles value of "0". Note that the use of the phrase "TSB capacity" will be understood to mean that the allocated TSB 378 (FIG. 3A) size from the first (or oldest) allocated cluster to the most recently allocated cluster is about to be exceeded, requiring the deallocation of the oldest cluster (and making it writeable) from the TSB 378 and the reallocation of a replacement cluster. It will be understood, in the context of TSB capacity, that in the preferred embodiments of the invention, clusters are dynamically allocated and deallocated resulting in not necessarily having a first and last cluster, but more accurately, having an ever-changing oldest cluster and most recently allocated cluster such that the size of the TSB 378 is always maintained as substantially constant. Thus, cluster 1 is now available to be allocated for the TSB file or for other files. Further, device driver 311 seeks to allocate another cluster from the available pool of clusters listed in the FAT (i.e. those clusters with LinkedFiles values of "0") to replace cluster 1. Assume that cluster 30 is the next available cluster (i.e., cluster 30 initially has a zero value). Once the device driver 311 allocates cluster 30, the device driver 311 increments the cluster 30 LinkedFiles value from "0" to "1". Alternatively, device driver 311 can keep the LinkedFiles value of cluster 1 equal to a value of one and cause an overwrite with another media content instance, providing for a circular style, overwriting buffer arrangement.

Figure 8C:
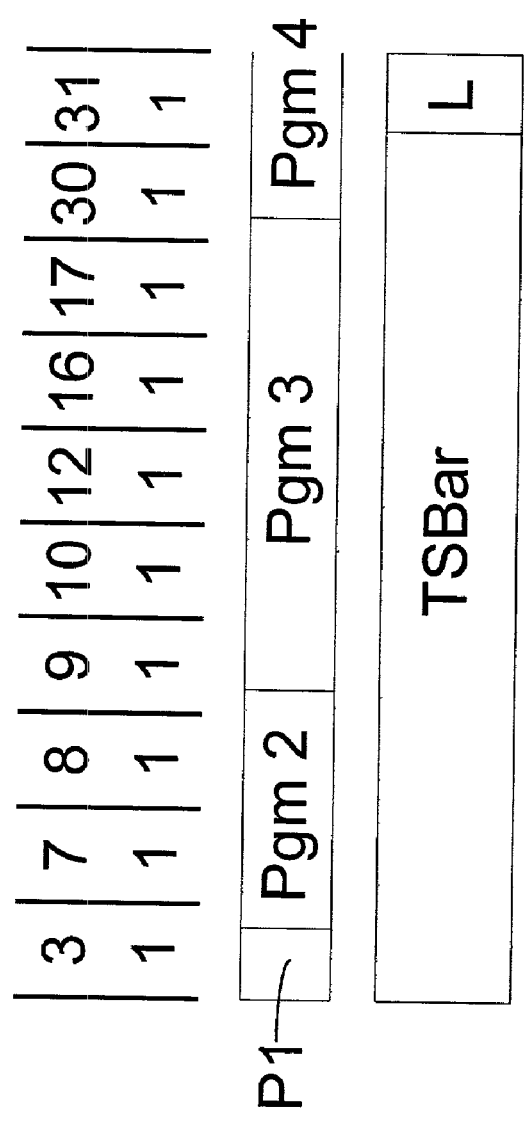

When the writing of Program 3 is completed, the next media content instance, program 4, is written to the available sectors of cluster 30. The live point "L" 850 in the TSBar 810 represents that Program 4 is currently being written to cluster 30. As the TSB 378 (FIG. 3A) shifts (i.e. the write location advances) and cluster 30 is full, the device driver 311 (FIG. 3A) seeks the next cluster in the TSB 378 to write program 4. Following a similar procedure as described above, device driver 311 will deallocate cluster 2 (and decrement its corresponding LinkedFiles value) and allocate another cluster (for example, cluster 31) and increment its corresponding LinkedFiles value from "0" to "1". Further, device driver 311 will start writing Program 4 to the newly allocated cluster, as illustrated in FIG. 8C. At this point, the amount of data for Program 1 is reduced by the amount that was previously in cluster 1 and cluster 2. As the TSB 378 shifts, this process of deallocation and allocation continues for the balance of the write of Program 4 and for writing more media content instances into the TSB 378. At least at program breaks and at the start of writing to a new cluster, the PVR application 377 (FIG. 3A) requests update information from the device driver 311 and, as well, the FAT 500 is updated by the device driver 311. This updating can occur at an even greater frequency through several mechanisms. In one embodiment, the updating can occur upon request (for example, an API invocation every 10 msec) from the PVR application 377. In other embodiments, the PVR application 377 sets up a timer interrupt (in cooperation with the operating system 353 (FIG. 3A)) synched to 10 msec intervals of the internal real-time clock (not shown) of the DHCT 16 (FIG. 3A) to provide the NPT update. In other embodiments, a greater or lesser frequency of update can be used. In other embodiments, updates can occur at other times or during other events as well.

Figure 9A:
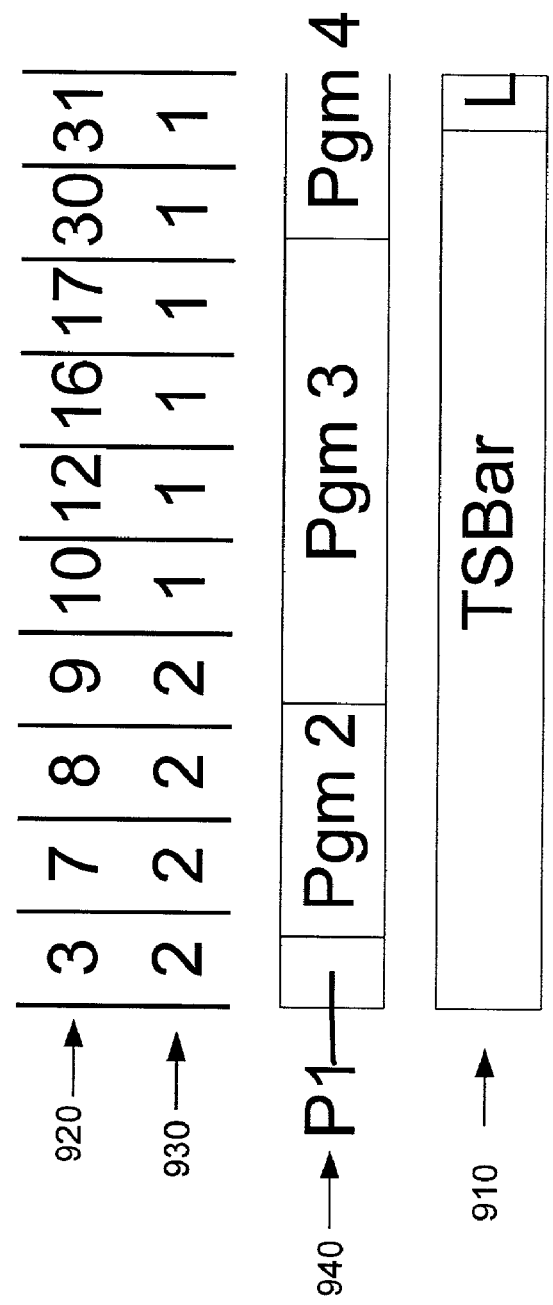
Figure 9D:
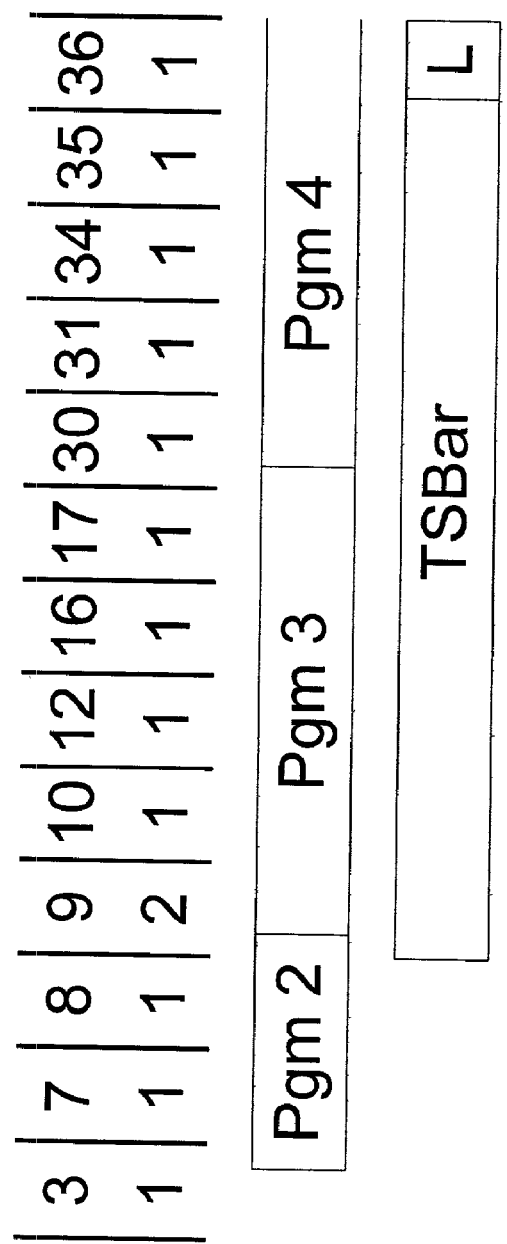
Figure 9E:
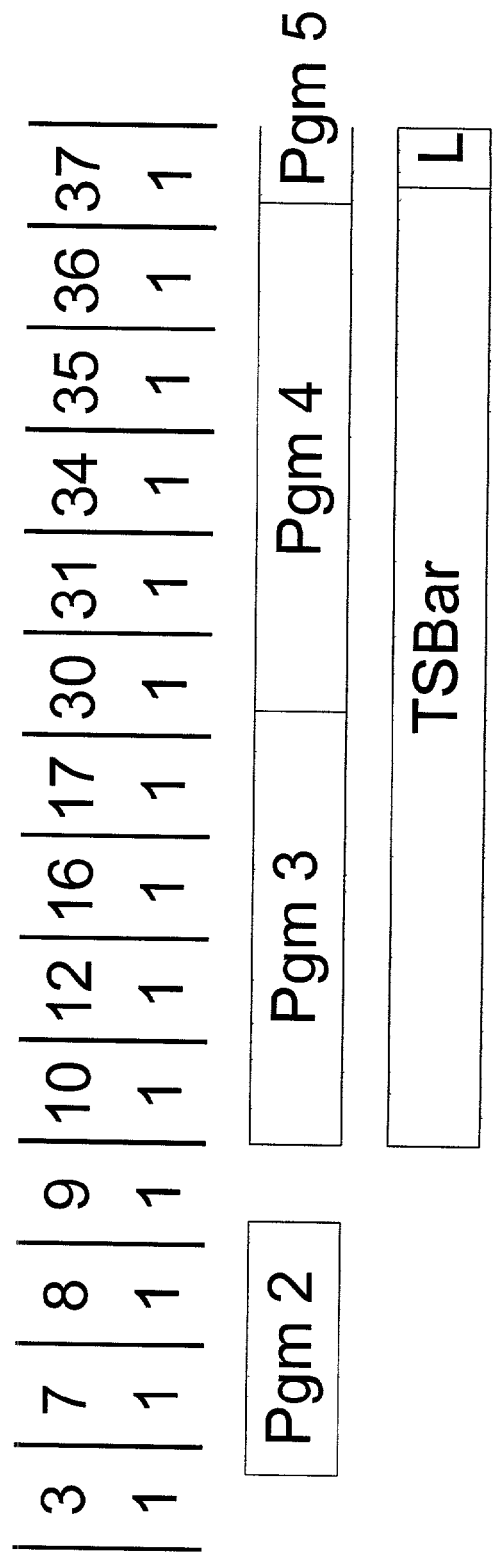

In addition to the stop and start locations for each media content instance, the PVR application 377 (FIG. 3A) maintains the complete guide data for the buffered and recorded media content instances. This data is provided by either maintaining a pointer to a media content instance guide database (not shown) in the PVR application 377, or by copying the particular media content instance information from a media content instance guide database (such as an EPG database or a database maintained in application memory 370 (FIG. 3A)) to the database of the PVR application 377. Alternatively, the PVR application 377 may use the applications database 370 in lieu of providing its own database. Preferably, the PVR application 377 uses the storage device 373 for storing the media content instance guide data. The media content instance guide data provides a source for the PVR application 377 to display (to a user) a list of media content instances currently in the storage device 373 that have guide data available FIGS. 9A–9I are block diagrams that illustrate one implementation for permanently recording out of the TSB 378 (FIG. 3A). Referring to FIG. 9A, assume the user has decided to permanently record Program 2 (or media content instance 2) after the last TSB shift illustrated in FIG. 8C. As indicated earlier, a permanent recording can be accomplished by rewinding through the TSB 378 to any point in Program 2, and then pressing the "record" button on a remote device (such as remote control device 380 shown in FIG. 12). Alternatively, among many other alternatives, the user can select "record" from a list displayed on a screen display. In response to the request to permanently record Program 2 from the TSB 378, the PVR application 377 (FIG. 3A) invokes a special API (as described in FIG. 7C) which takes as arguments information which describes the start and end locations (in NPT) of Program 2. A new permanently recorded file is then created (for example, filerecord1 from FIG. 5C) with a corresponding FAT entry that includes a list of the clusters which Program 2 encompasses as well as the stop and end sectors within those clusters for Program 2, as described above. The new permanently record file is now linked with these clusters and the LinkedFiles value for each of these clusters is incremented, as represented in FIG. 9A. As indicated, Program 2 is stored across clusters 3, 7, 8, and 9.

Referring to FIG. 9B, when the TSB 378 (FIG. 3A) shifts, the data for cluster 3 persists. Because the device driver 311 (FIG. 3A) recognizes that cluster 3 has a LinkedFiles value of "2", it will not delete that cluster, but instead, allocates a new cluster, cluster 34, to its list for continually writing Program 4 . Cluster 3 is eventually removed (e.g. as the writing progresses) from the TSB cluster list and its LinkedFiles value decremented to "1". Data in cluster 3 for Program 1, though it also exists, is essentially lost because Program 1 was never marked as recorded (i.e. designated with a LinkedFiles value greater than "1"). Thus, the LinkedFiles value provides a notice to the device driver 311 that prevents the device driver 311 configuring the associated cluster as writeable. The LinkedFiles value also provides a notice to the device driver 311 to allocate replacement clusters in order to maintain a substantially constant TSB 378.

FIG. 9C illustrates the next TSB 378 (FIG. 3A) shift. To continue to write Program 4, the device driver 311 (FIG. 3A) allocates another cluster, cluster 35 (and increments its LinkedFiles value), because cluster 7 has two file links (a value of "2") corresponding to the TSB file and the permanently recorded file. As the TSB shifts, cluster 7 is removed from the TSB 378. The device driver 311 also decrements the cluster 7 LinkedFiles value to "1". At the next shift point, illustrated by FIG. 9D, cluster 8, also part of Program 2, is deallocated from the TSB 378 and cluster 36 is added. At the next shift point, illustrated by FIG. 9E, cluster 9, also part of Program 2, is deallocated from the TSB 378 and cluster 37 is added to complete the write of Program 4 and start writing new media content instance, Program 5. Program 2 is not within the boundaries of the TSB 378. As described above, the PVR application 377 (FIG. 3A) maintains the correlation between the location of the media content instance in the TSB 378 and the corresponding playback point in the media content instance. The user cannot reach Program 2 by rewinding within the TSB 378. If the user was currently playing Program 2, he could only get the TSB 378 by stopping the recorded file playback.

Figure 10A:
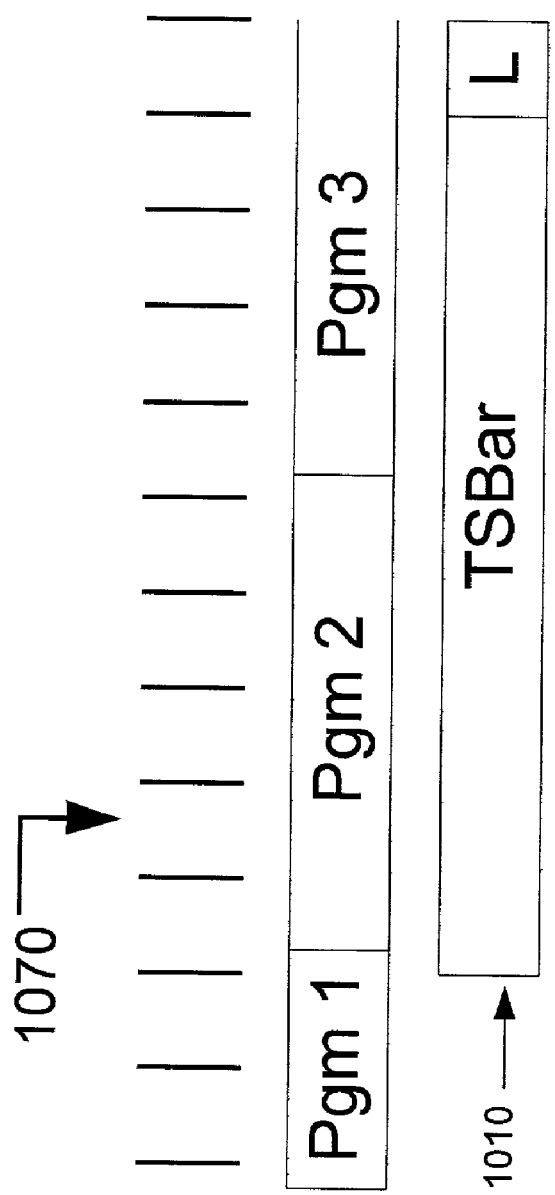
FIGS. 10A and 10B are block diagram illustrations depicting how the PVR application handles playback transitions between a permanently recorded file and the TSB file, in accordance with one embodiment of the invention.
Figure 10B:
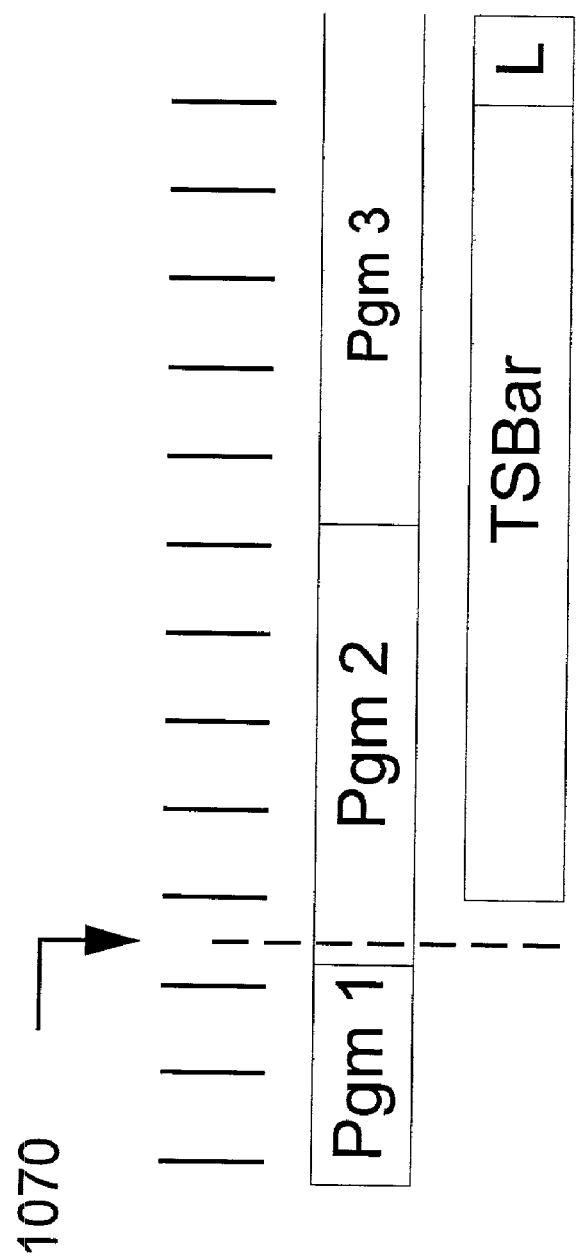

After the new permanently recorded file is created, the active playback file is still the TSB file (e.g., TSBfile). The newly created permanently recorded file is open also. Although the new permanently recorded file is not actively being written to or read from, it can share clusters with the TSB file that are being read. The user can still perform trick modes and play from the same TSB file. FIG. 10A depicts a possible state when the user decided to permanently record Program 2 . Note that the cluster entry 920 and LinkedFiles entry 930 of FIG. 9A have been removed for FIG. 10A to simplify discussion. In this example, the playback point 1070 is within the range of the TSB file (as denoted by the TSBar 1010) and the user can move through any part of the TSB file. If the playback point 1070 falls outside of the bounds of the TSB file (as represented by TSBar 1010), as illustrated in FIG. 10B, the active playback file transitions to the permanently recorded file. This latter situation can occur if the user is in a paused mode, while the device driver is continually writing real-time media content to the TSB 378 (FIG. 3A). Eventually, if paused long enough, the read location corresponding to the paused position can be at a cluster location that has been deallocated from the TSB 378. At this point, the PVR application 377 (FIG. 3A) handles the playback as a normal playback from a permanently recorded file.

Figure 10C:
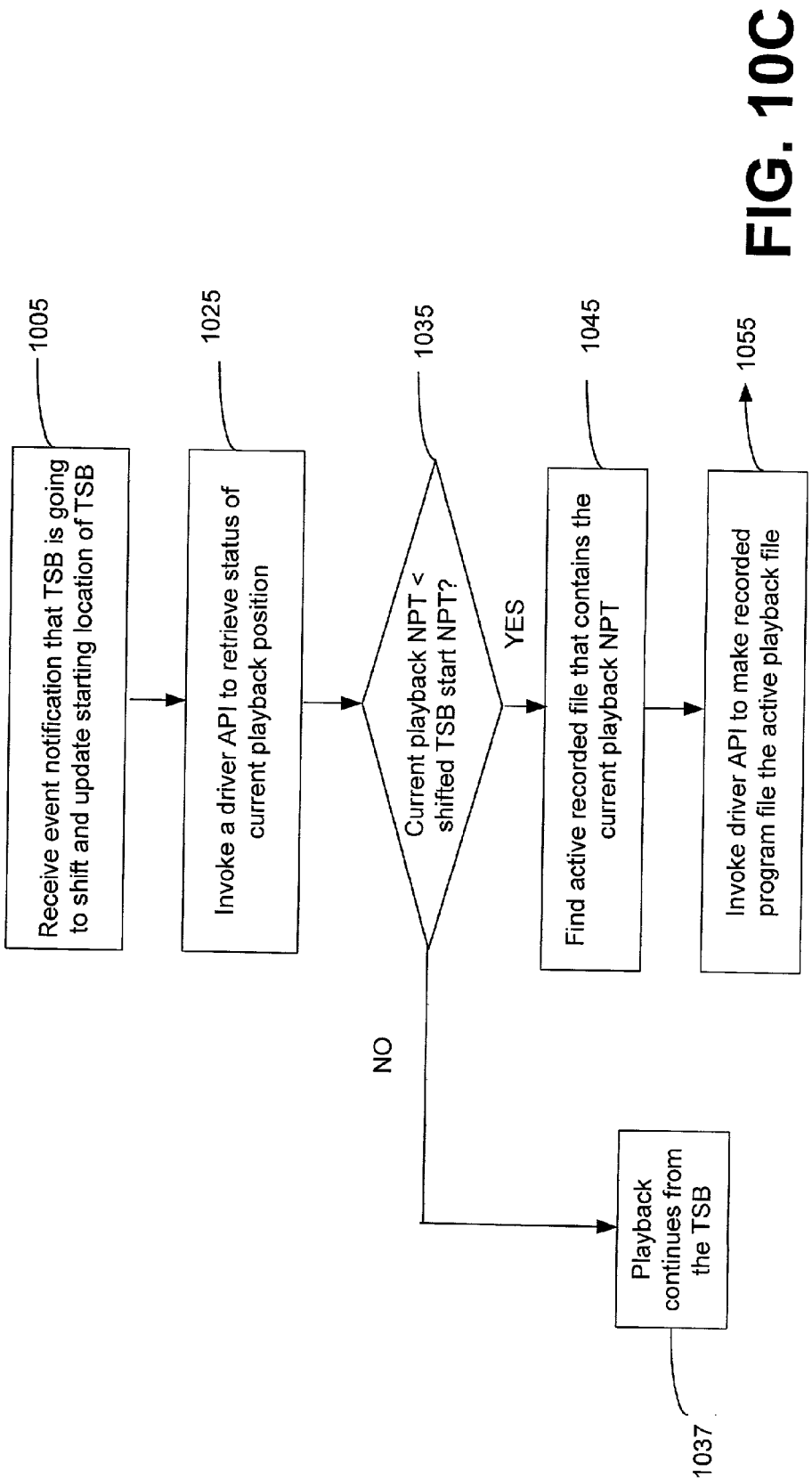
FIG. 10C is a flowchart depicting how the PVR application handles playback transitions between the permanently recorded file and the TSB file, in accordance with one embodiment of the invention.

Because the PVR application 377 (FIG. 3A) is aware of the TSB 378 (FIG. 3A) and the permanently recorded file boundaries, it can handle the aforementioned transitions according to the flowchart depicted in FIG. 10C, in accordance with one embodiment of the invention. As noted in FIG. 10C, step 1005 provides that the PVR application 377 receives an event notification from the device driver 311 (FIG. 3A) that the TSB 378 is going to shift and updates the TSB starting location (e.g. startNPT in example "C" programming depicted in FIG. 4B). This event can be anything that causes the shift, including a continued write of a media content instance to a new cluster of the TSB 378, or a new media content instance write to a new cluster of the TSB 378, when the TSB 378 is at capacity. Step 1025 provides that the PVR application 377 invokes a driver API to retrieve status of current playback position from the device driver 311. The example driver API illustrated in FIG. 10D returns the current NPT for the specified handle (TSB 378 in this example). The "handle" indicated is the handle previously returned by a "call" to open the TSB file or to make a scheduled (stand-alone) permanent recording. "Npt" is the current position in the recording. "Scale" is the current rate and direction of play. "Mode" indicates "PAUSED", "PLAYING", or "RECORDING". Referring again to FIG. 10C, step 1035 provides that the PVR application 377 compares the current playback location (NPT) with the shifted TSB start location (NPT). If the current playback location is greater than the shifted TSB start location, then playback continues from the TSB 378 (step 1037). If the current playback location is less than the shifted TSB start location, step 1045 provides that the PVR application 377 finds any active permanently recorded file that contains the current playback NPT. In the example depicted in FIG. 10B, the permanently recorded file for Program 2 contains the current playback NPT. Step 1055 provides that the application calls a driver API which makes the permanently recorded file act as the active file without disrupting the playback. An example signature for this API is illustrated in FIG. 10E. In this API, "tsbHandle" is the handle for the TSB 378. "Handle" is the handle for the permanently recorded file.

Figure 11A:
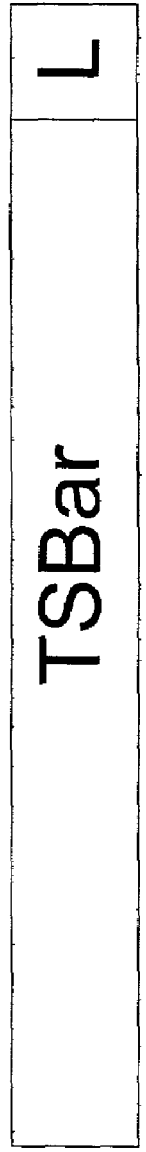
Figure 11B:
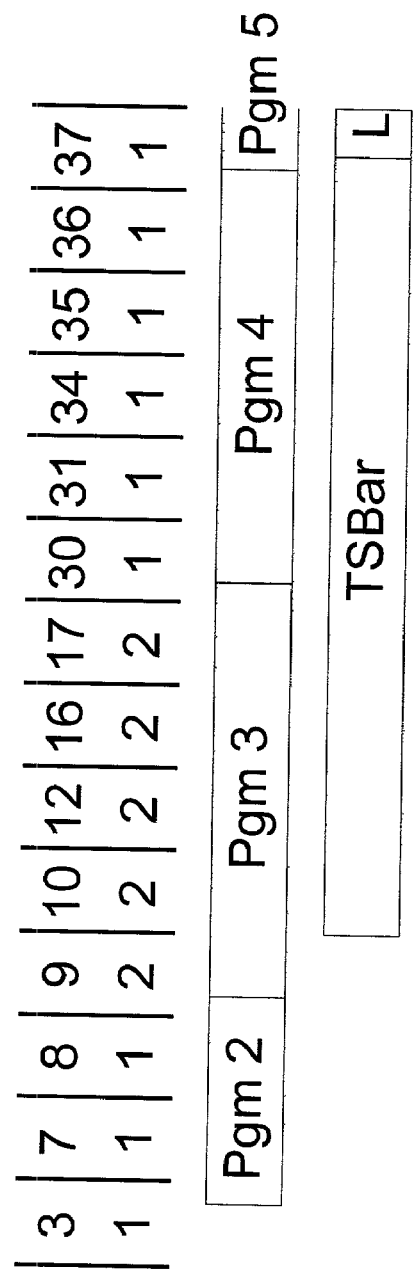

In one embodiment, contiguous media content instances can be stored without losing any beginning or end of media content instance, or media content instance data. This is because two contiguous media content instances can share a cluster which contains data for both media content instances. FIG. 11A is a block diagram depicting an example of when a user decides to record more than one media content instance before the last TSB shift depicted in FIG. 9E. Program 2 and 3 are requested media content instances for designation as permanent recordings. In this example, cluster 9 now has a LinkedFiles value of 3. It is shared by the permanently recorded files of Program 2, Program 3, and the TSB file for TSB 378 (FIG. 3A) (thus the "3" value). As shown in FIG. 11B, at the next shift point, cluster 9 is removed from the TSB 378, and its LinkedFiles value is decremented to "2" by the device driver 311 (FIG. 3A). Further, the device driver allocates cluster 37 as a replacement to the deallocated cluster (cluster 9). At the next shift point, illustrated by FIG. 11C, Cluster 10 is deallocated from the TSB 378 and its LinkedFiles value decremented, while cluster 38 is allocated.

Figure 12:
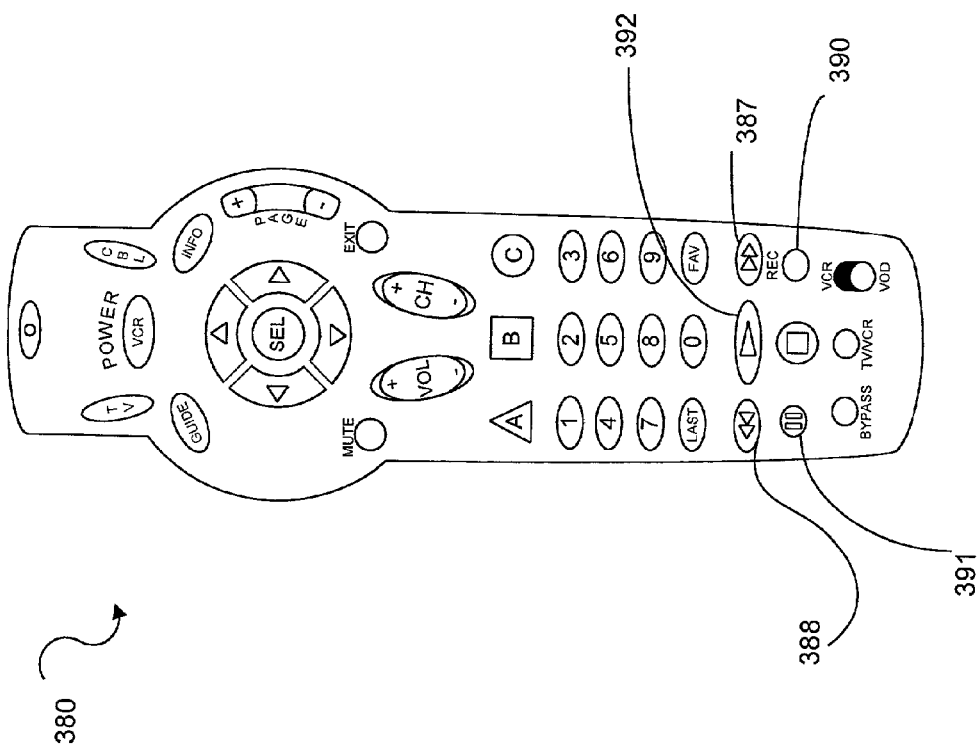
FIG. 12 is a block diagram of an example remote control device for providing input to the DHCT depicted in FIG. 3A, in accordance with one embodiment of the invention.

As described earlier, the user permanently records from the TSB 378 (FIG. 3A) by returning to any part of a media content instance in the TSB 378 and selecting playback and then record from a remote device 380 (described below), or alternatively, from selecting record from a pre-configured table or list entry in a user interface screen generated on a screen display. An example remote control device 380 to provide input to the DHCT 16 (FIG. 3A) is illustrated in FIG. 12. Rewind 388 and fast-forward 387 buttons enable a user to access buffered media content instances in the TSB 378. Record button 390 enables the user to permanently record any media content instance buffered into the TSB 378, as described below. Pause button 391 enables the user to pause a media content instance, or pause during a search for a particular media content instance. Playback 392 enables the playback of a media content instance. Many alternative methods of providing user input may be used including a remote control device with different buttons and/or button layouts, a keyboard device, a voice activated device, etc. Further, a user interface may present screen symbols corresponding to buttons on the remote control device 330 which suggest recording functionality. The embodiments of the present invention described herein are not limited by the type of device used to provide user input.

Figure 13A:
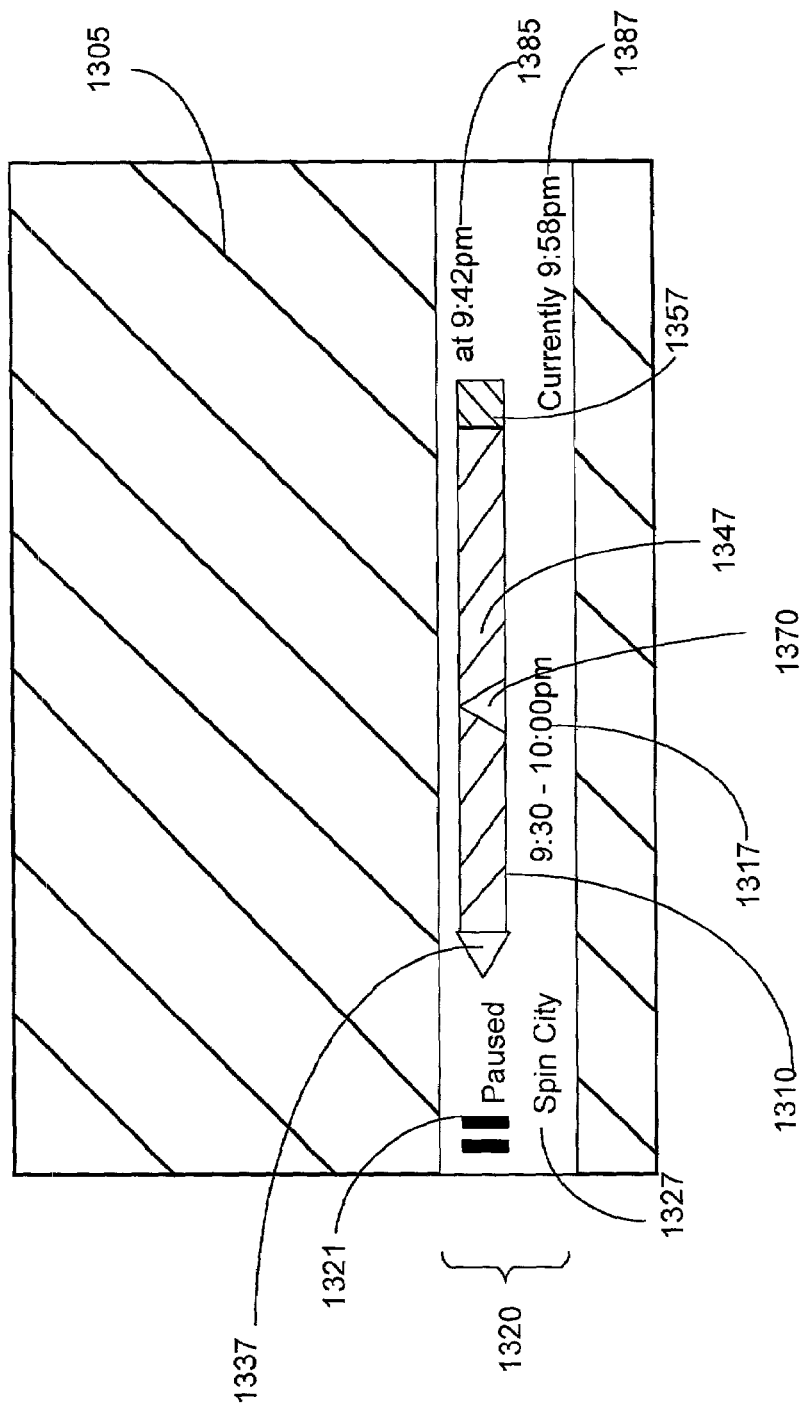
FIGS. 13A–13C are screen diagrams of example user interface screen displays depicting how a progress bar can be used as a source of information about media content instances in the TSB, as well as how the progress bar can be used to navigate a user through the TSB, in accordance with one embodiment of the invention.
Figure 13B:
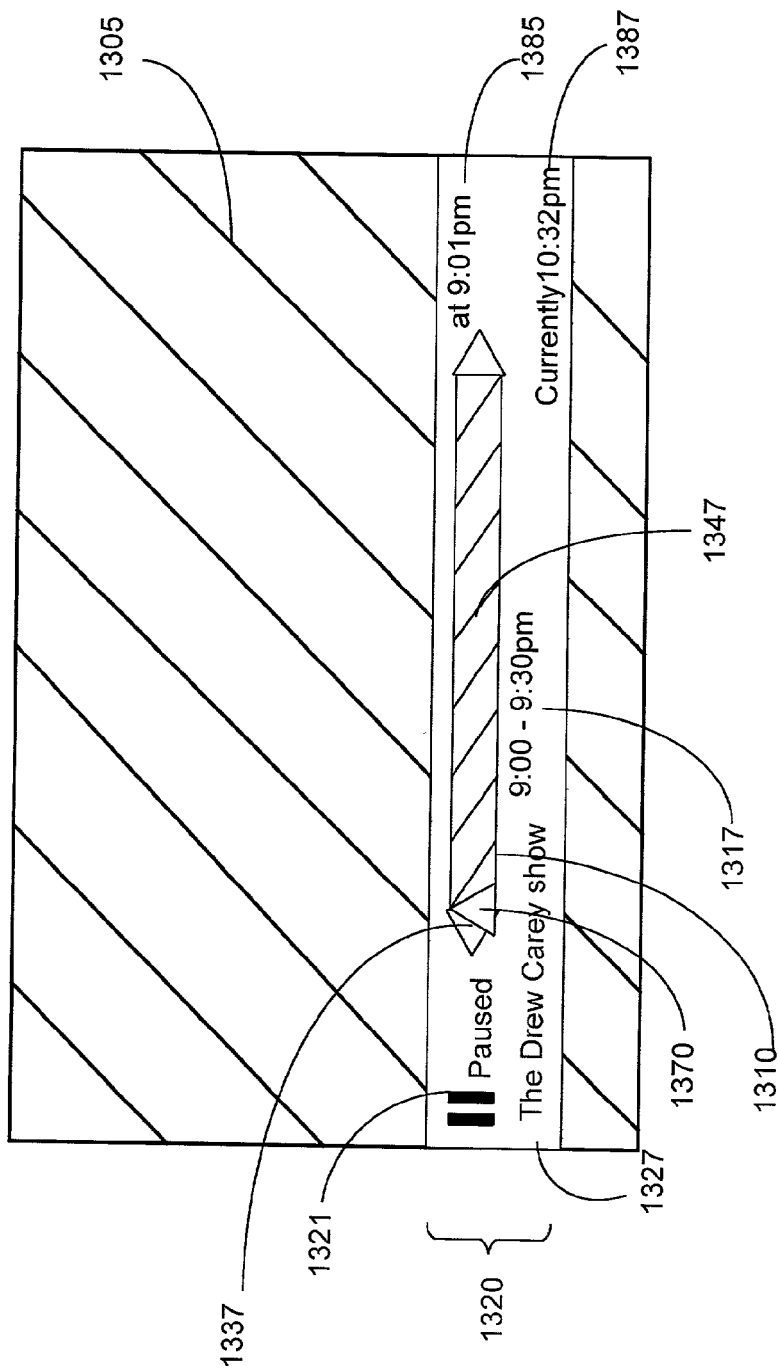
Figure 13C:
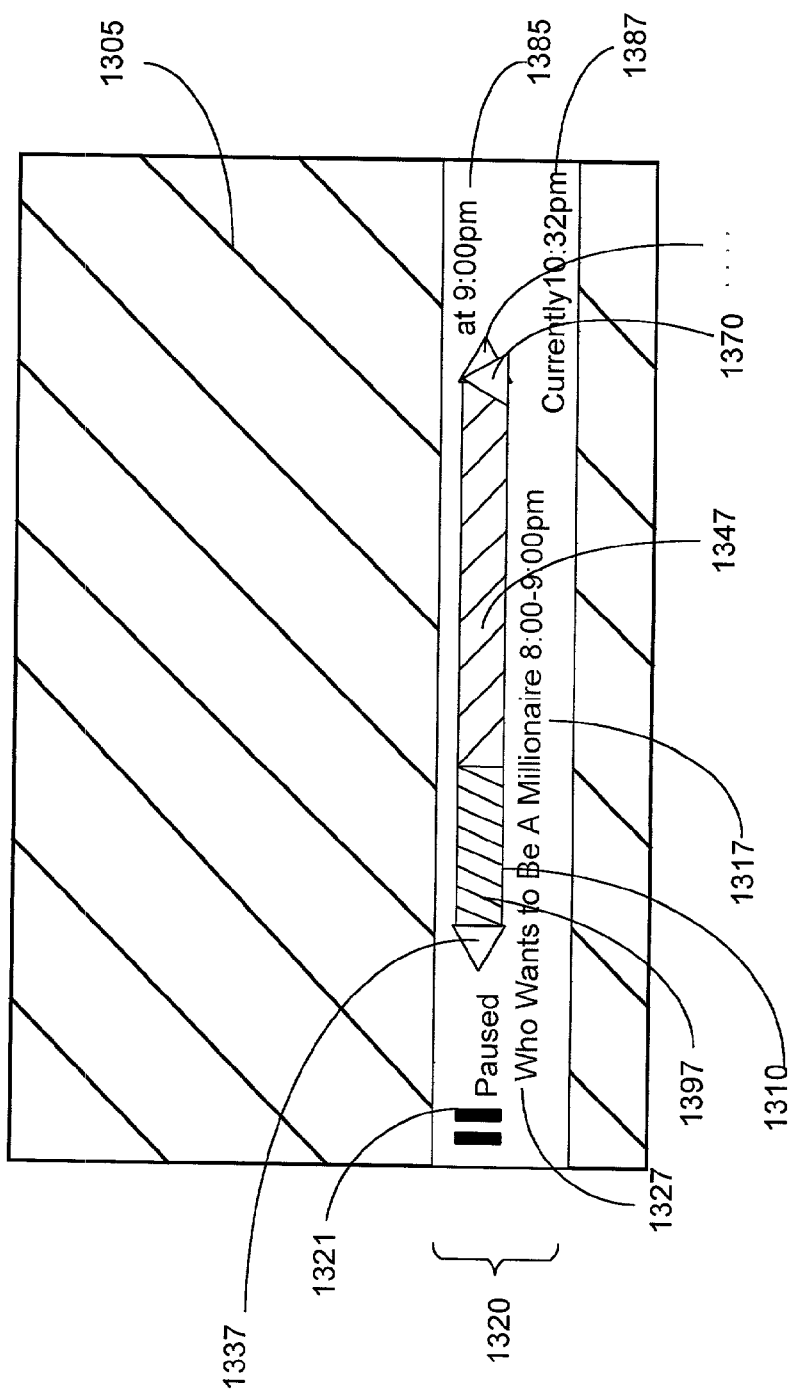

The PVR application 377 (FIG. 3A) provides a user interface that assists the user in navigating to, and between, buffered media content instances. Specifically, the user interface provides a display of the user's current position in a buffered media content instance (e.g. TV program) relative to the currently viewed time-shifted media content instance. The currently viewed, time-shifted media content instance length is represented by a "progress bar" displayed at the bottom of the screen. Thus, the "progress bar" indicates the media content instance time boundaries, and is labeled with the media content instance information, as will be described below. FIGS. 13A–13C are screen diagrams that illustrate an example user interface screen display that can be presented on, for example, a television or other display device. These example screen displays depict a progression through three media content instances of a TSB 378 (FIG. 3A), including a short rewind between the beginning of one media content instance and the end of the media content instance before it. During rewind of the TSB 378, one or more media content instances may be available for playback or recording depending on the length of time the channel was tuned.

FIG. 13A is an example screen display of the most recent media content instance after rewinding 16 minutes and then pausing. A pause banner 1320 and progress bar 1310 are overlaid on top of a display of a media content instance. The media content instance display is depicted as closely hashed lines 1305. Pause banner 1320 includes pause icon 1321, and time status 1385 indicating the location in the buffered media content instance. Current time 1387 indicates the current time of day. Title portion 1327 indicates the title of the buffered media content instance associated with the current progress bar 1310. The progress bar 1310 shows progression, in terms of TSB space, through a media content instance as the viewer moves, or navigates, through it. Although depicted as a media content instance specific indicator, other embodiments are contemplated, including, but not limited to, indicators of the entire TSB capacity. Media content instance time 1317 indicates the scheduled media content instance start and end time. Bar arrow 1337 represents that there are more buffered media content instances available. The bar arrow 1337 suggests that these other buffered media content instances can be accessed by, for example, rewinding to them.

First portion 1347 (depicted with hash lines) indicates the amount of the current media content instance that is buffered (i.e. written to the TSB 378, FIG. 3A). Thus, first portion 1347 provides the user with an indication as to what portion of the current media content instance is available for rewinding and fast-forwarding. Second portion 1357 (indicated with reverse hash lines) indicates that the media content instance is not over, as indicated also by the current time 1387 in the media content instance (i.e. 9:58 pm). For example, the user has rewound for 16 minutes. From the current time 1387, that places the status arrow 1370 at 9:58 minus 16 minutes, or at 9:42 within the buffered media content instance Spin City, which is reflected by time status 1385. In other words, if the user had entered into the room at 9:42, the screen display would show the same media content instance "snap-shot" as it does now. If the user wants to permanently record, the user preferably selects the record button 390 on the remote device 380 (FIG. 12).

The next example screen display, as depicted in FIG. 13B, is of a display of a media content instance buffered into the TSB 378 (FIG. 3A) before the most recent one (FIG. 13A) and after rewinding it 30 minutes or the whole media content instance length. As noted by title portion 1327 and status arrow 1370 and time status 1385, the user has rewound to the beginning of The Drew Carey Show. The first portion 1347 indicates that the entire show was buffered into the TSB 378. Bar arrows 1337 on each end of the progress bar 1310 suggest to the user that there are buffered media content instances accessible before and after The Drew Carey Show. Note current time 1387 of 10:32 PM, further illustrating the ability of the PVR application 377 (FIG. 3A) to access and record buffered media content instances. To permanently record, the user typically selects the record button 390 on the remote control device 380 (FIG. 16) at any point within the Drew Carey Show. Alternatively, among other alternatives, the user can select the record button 390 while the media content instance is paused.

The next example screen display depicted in FIG. 13C is of the display of a media content instance that was buffered just before the media content instance shown in FIG. 13B. No rewinding of this media content instance has occurred yet, as indicated by status arrow 1370 and the time status 1385. As noted by the title portion 1327, this buffered media content instance is Who Wants To Be A Millionaire. Note that the progress bar 1310 shows only one bar arrow 1337 on the right hand side, illustrating the fact that there are no other media content instances buffered in the TSB 378 (FIG. 3A) before Who Wants To Be A Millionaire. Also note that unavailable portion 1397 indicates the amount of the media content instance that is unavailable to permanently record or view. It would be unavailable, for example, if the channel with this media content instance were not tuned during this time. Again, to permanently record, the user preferably selects the record button 390 on the remote control device 380 (FIG. 12) during any point in Who Wants To Be A Millionaire.

As an alternative to rewinding to the media content instance in the TSB 378 (FIG. 53A) desired for permanently recording, a user interface screen (not shown) may be presented that lists the media content instances currently in the TSB 378, with a mechanism to select which of these media content instances the user desires to permanently record (i.e. designate as permanent, not part of the TSB 378). The list of media content instances can be ascertained from the media content instance guide data, as described above.

Figure 14:
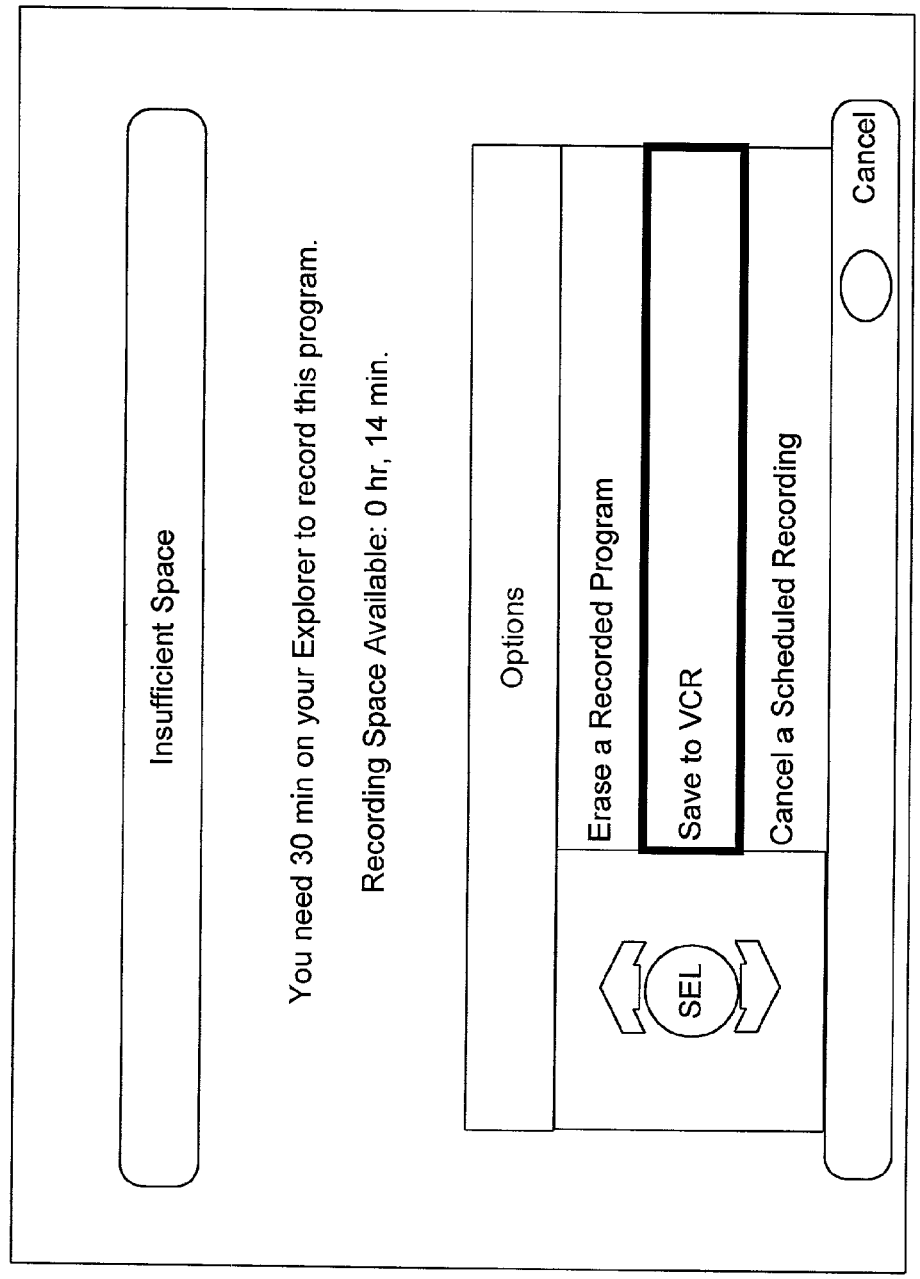
FIG. 14 is a screen diagram of an example user interface screen display depicting a barker, which warns of the absence of an adequate amount of hard disk storage space for recording.

FIG. 14 is an example screen barker 1400 that is presented to the user when there is not enough available hard disk space for permanently recording. As described earlier, the device driver 311 (FIG. 3A) communicates through the operating system 353 (FIG. 3A) to the PVR application 377 (FIG. 3A) to keep the PVR application 377 updated with information about available free space. The PVR application 377, which already "knows" how much time each buffered media content instance consumes, can cause the example screen barker 1400 to pop up to a user to warn of unavailable space. The user can then, by selecting buttons on the remote device 380 (FIG. 12), be presented with a list of permanently recorded media content instances to choose from to decide which ones to delete.

Note that the scope of the preferred embodiments of the invention is not limited to systems where viewing conflicts may arise due to, among other reasons, the variety and quantity of viewing options. Systems with limited viewing options are also encompassed by the scope of the preferred embodiments.

The PVR application 377 (FIG. 3A) and device driver 311 (FIG. 3A) of the present invention can be implemented in hardware, software, firmware, or a combination thereof. In the preferred embodiment(s), the PVR application 377 and device driver 311 is implemented in software or firmware that is stored in a memory and that is executed by a suitable instruction execution system. If implemented in hardware, as in an alternative embodiment, the PVR application 377 and device driver 311 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The PVR application 377 (FIG. 3A) and device driver 311 (FIG. 3A), which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document., a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Blocks in the flow chart of FIG. 10C should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred embodiments" are merely possible examples of implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, at least the following is claimed:

1. A file allocation method for a hard disk drive comprising the steps of:
   receiving a request to allocate hard disk space of a defined size for a buffer file;
   allocating clusters for the buffer file from a plurality of clusters on the hard disk, wherein the clusters for the buffer file store media content instances;
   designating a portion of the clusters of the buffer file for at least one non-buffer file such that the non-buffer file is permitted to simultaneously share the portion of the clusters with the buffer file; and
   limiting the buffer file to a substantially constant buffer file size, such that when the buffer file approaches a full status, the cluster storing the oldest media content is first deallocated from the buffer file and a new cluster is correspondingly allocated to the buffer file.

2. The method of claim 1, further comprising the step of maintaining a file sharing count for the clusters of the buffer file, such that the clusters with the file sharing count greater than one are removed from the buffer file.

3. The method of claim 1, further comprising the steps of removing from the buffer file the portion of the clusters that are shared by the buffer file and the non-buffer file and designating said previously shared portion as a portion of non-buffer file clusters.

4. The method of claim 3, wherein the non-buffer file clusters are used for permanent recordings.

5. The method of claim 3, further comprising the step of replacing the removed clusters with replacement clusters for the buffer file to maintain the defined size of the disk space for the buffer file as substantially constant.

6. The method of claim 5, wherein the step of replacing further includes the steps of finding the clusters on the hard disk that have a file sharing count equal to zero and incrementing the file sharing count of said clusters to one.

7. The method of claim 1, further comprising the step of using a first data structure comprising list entries for the buffer file and the non-buffer file, wherein the list entries include filenames, the clusters allocated for the buffer file and the non-buffer file, and starting sectors and ending sectors for the non-buffer file.

8. The method of claim 1, further comprising the step of using a second data structure comprising list entries for all of the clusters, wherein the list entries include the identities of each one of the clusters and the quantity of all of the hard disk files that share each one of the clusters.

9. The method of claim 1, further comprising the step of updating at least one file allocation table data structure at the request of an application.

10. The method of claim 1, further comprising the step of updating at least one file allocation table data structure based on pre-programmed timer events initiated by an application.

11. The method of claim 1, further comprising the step of writing the media content instances to the clusters of the buffer file and, for scheduled recordings, the clusters of the non-buffer file.

12. The method of claim 11, further comprising the step of tracking a current write and read location using a normal play time value.

13. The method of claim 11, further comprising the step of correlating sector and the cluster locations storing the media content instances with a normal play time value.

14. The method of claim 11, further comprising the step of receiving a write request from an application.

15. The method of claim 11, further comprising the step of returning to an application normal play time values corresponding to the media content instances locations, the buffer file and the non-buffer file locations on the disk space that the media content instances are written to, and a current write location upon receiving an update request from an application.

16. The method of claim 1, wherein the steps of allocating and designating further includes the step of allocating the clusters for a plurality of buffer files and designating portions of the clusters of the plurality of the buffer files for a plurality of non-buffer files.

17. The method of claim 1, wherein the non-buffer file is a permanently recorded file.

18. The method of claim 17, wherein the permanently recorded file can be deleted.

19. The method of claim 18, wherein the clusters of the deleted permanently recorded file are configured as writeable.

20. The method of claim 1, further comprising the step of receiving a request from an application to open the non-buffer file to permanently record at least one of the media content instances stored in the clusters of the buffer file.

21. The method of claim 20, further comprising the step of storing a starting and ending sector and cluster locations, for the media content instance to be designated as the permanent recording, in a file allocation table data structure.

22. The method of claim 20, further comprising the steps of calculating and returning to the application starting and ending normal play time values corresponding to the locations of the media content instance designated as the permanent recording.

23. A file allocation method for a hard disk drive comprising the steps of:
   receiving a request to allocate hard disk space of a defined size for a buffer file;
   allocating clusters for the buffer file from a plurality of clusters on the hard disk, wherein the clusters for the buffer file store media content instances;
   designating a portion of the clusters of the buffer file for at least one non-buffer file such that the buffer file is permitted to simultaneously share the portion of the clusters with the non-buffer file;
   using the non-buffer file clusters for permanent recordings;
   maintaining a file sharing count for the clusters of the buffer file, such that the clusters with the file sharing count greater than one are removed from the buffer file;
   removing from the buffer file the portion of the clusters that are shared by the buffer file and the non-buffer file and designating said previously shared portion as a portion of non-buffer file clusters;
   replacing the portion of the clusters that were removed from the buffer file with replacement clusters in order to maintain the defined size of the disk space for the buffer file as substantially constant; and
   limiting the buffer file to a substantially constant buffer file size, such that when the buffer file approaches a full status, the cluster storing the oldest media content is first deallocated from the buffer file and a new cluster is correspondingly allocated to the buffer file.

24. A file allocation system for a hard disk drive comprising:
   a memory with driver logic; and
   a processor configured with the driver logic to receive a request to allocate hard disk space of a defined size for a buffer file, wherein the processor is further configured with the driver logic to allocate clusters for the buffer file from a plurality of clusters on the hard disk, wherein the clusters for the buffer file store media content instances, wherein the processor is further configured with the driver logic to designate a portion of the clusters of the buffer file for at least one non-buffer file such that the buffer file is permitted to simultaneously share the portion of the clusters with the non-buffer file, wherein the processor is further configured with the driver logic to use the non-buffer file clusters for permanent recordings, wherein the processor is further configured with the driver logic to maintain a file sharing count for the clusters of the buffer file, such that the clusters with the file sharing count greater than one are removed from the buffer file, wherein the processor is further configured with the driver logic to remove from the buffer file the portion of the clusters that are shared by the buffer file and the non-buffer file and designating-said previously shared portion-as a portion of non-buffer file clusters, wherein the processor is further configured with the driver logic to replace the portion of the clusters that were removed from the buffer file with replacement clusters in order to maintain the defined size of the disk space for the buffer file as substantially constant;

wherein the processor is further configured to limit the buffer file to a substantially constant buffer file size, such that when the buffer file approaches a full status, the cluster storing the oldest media content is first deallocated from the buffer file and a new cluster is correspondingly allocated to the buffer file.

25. A file allocation system for a hard disk drive comprising:

a memory with driver logic; and a processor configured with the driver logic to receive a request to allocate hard disk space of a defined size for a buffer file, wherein the processor is further configured with the driver logic to allocate clusters for the buffer file from a plurality of clusters on the hard disk, wherein the clusters for the buffer file store media content instances, wherein the processor is further configured with the driver logic to designate a portion of the clusters of the buffer file for at least one non-buffer file such that the non-buffer file is permitted to simultaneously share the portion of the clusters of the buffer file with the buffer file;

wherein the processor is further configured to limit the buffer file to a substantially constant buffer file size, such that when the buffer file approaches a full status, the cluster storing the oldest media content is first deallocated from the buffer file and a new cluster is correspondingly allocated to the buffer file.

26. The system of claim 25, wherein the processor is further configured with the driver logic to maintain a file sharing count for the clusters of the buffer file, such that the clusters with the file sharing count greater than one are removed from the buffer file.

27. The system of claim 25, wherein the processor is further configured with the driver logic to remove from the buffer file the portion of the clusters that are shared by the buffer file and the non-buffer file and designate said previously shared portion as a portion of non-buffer file clusters.

28. The system of claim 27, wherein the non-buffer file clusters are used for permanent recordings.

29. The system of claim 27, wherein the processor is further configured with the driver logic to replace the removed clusters with replacement clusters for the buffer file to maintain the defined size of the disk space for the buffer file as substantially constant.

30. The system of claim 29, wherein the processor is further configured with the driver logic to find the clusters on the hard disk that have the file sharing count equal to zero and increment the file sharing count of said clusters to one.

31. The system of claim 25, wherein the processor is further configured with the driver logic to use a first data structure comprising list entries for the buffer file and the non-buffer file, wherein the list entries include filenames, the clusters allocated for the buffer file and the non-buffer file, and starting sector and ending sectors for the non-buffer file.

32. The system of claim 25, wherein the processor is further configured with the driver logic to use a second data structure comprising list entries for all of the clusters, wherein the list entries include the identities of each one of the clusters and the quantity of all of the hard disk files that share each one of the clusters.

33. The system of claim 25, wherein the processor is further configured with the driver logic to update at least one file allocation table data structure at the request of an application.

34. The system of claim 25, wherein the processor is further configured with the driver logic to update at least one file allocation table data structure based on pre-programmed timer events initiated with an application.

35. The system of claim 25, wherein the processor is further configured with the driver logic to write the media content instances to the clusters of the buffer file, and for scheduled recordings, the clusters of the non-buffer file.

36. The system of claim 35, wherein the processor is further configured with the driver logic to track a current write and read location using a normal play time value.

37. The system of claim 35, wherein the processor is further configured with the driver logic to correlate sector and the cluster locations storing the media content instances with a normal play time value.

38. The system of claim 35, wherein the processor is further configured with the driver logic to receive a write request from an application.

39. The system of claim 35, wherein the processor is further configured with the driver logic to return to an application normal play time values corresponding to the media content instances locations, the buffer file and non-buffer file location on the disk space that the media content instances are written to, and a current write location upon receiving an update request from an application.

40. The system of claim 25, wherein the processor is further configured with the driver logic to allocate the clusters for a plurality of buffer files and designate portions of the clusters of the plurality of the buffer files for a plurality of non-buffer files.

41. The system of claim 40, wherein the non-buffer file is a permanently recorded file.

42. The system of claim 41, wherein the permanently recorded file can be deleted and the clusters of the deleted permanently recorded file are configured as writeable.

43. The system of claim 25, wherein the processor is further configured with the driver logic to receive a request from an application to open the non-buffer file to permanently record at least one of the media content instances stored in the clusters of the buffer file.

44. The system of claim 43, wherein the processor is further configured with the driver logic to store a starting and ending sector and cluster locations, for the media content instance to be designated as the permanent recording, in a file allocation table data structure.

45. The system of claim 43, wherein the processor is further configured with the driver logic to calculate and return to the application starting and ending normal play time values corresponding to the locations of the media content instance designated as the permanent recording.

* * * * *